(12) United States Patent
Tanaka et al.

(10) Patent No.: US 7,606,453 B2
(45) Date of Patent: Oct. 20, 2009

(54) RIBBON-LIKE OPTICAL FIBER CORE ASSEMBLY, METHOD FOR PRODUCING THE SAME, TAPE CORE ASSEMBLY-CONTAINING CONNECTOR, TAPE CORE ASSEMBLY-CONTAINING OPTICAL FIBER ARRAY, AND OPTICAL WIRING SYSTEM

(75) Inventors: Kousuke Tanaka, Tochigi (JP); Toshifumi Hosoya, Kanagawa (JP); Tsuyoshi Ikada, Tochigi (JP); Kazuhiro Sato, Tochigi (JP); Hiroyasu Sugiyama, Tochigi (JP); Toshiaki Kakii, Kanagawa (JP); Tomohiko Ueda, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 407 days.

(21) Appl. No.: 10/525,093

(22) PCT Filed: Aug. 27, 2003

(86) PCT No.: PCT/JP03/10852

§ 371 (c)(1), (2), (4) Date: Feb. 23, 2005

(87) PCT Pub. No.: WO2004/021060

PCT Pub. Date: Mar. 11, 2004

(65) Prior Publication Data
US 2005/0281518 A1    Dec. 22, 2005

(30) Foreign Application Priority Data

| Aug. 29, 2002 | (JP) | ............................. 2002-250405 |
| Oct. 31, 2002 | (JP) | ............................. 2002-318727 |
| Nov. 20, 2002 | (JP) | ............................. 2002-336847 |

(51) Int. Cl.
G02B 6/44    (2006.01)

(52) U.S. Cl. .................................................. 385/114
(58) Field of Classification Search .......... 385/110–114
See application file for complete search history.

(56) References Cited

U.S. PATENT DOCUMENTS

| 4,900,126 A | 2/1990 | Jackson et al. |
| 5,253,318 A | 10/1993 | Sayegh et al. |
| 5,276,759 A * | 1/1994 | Nguyen et al. ............... 385/114 |

(Continued)

FOREIGN PATENT DOCUMENTS

CN    1039121 A    1/1990

(Continued)

OTHER PUBLICATIONS

Chinese Office Action with English translation issued in corresponding Chinese Patent Application No. CN 03820713.3, dated Apr. 6, 2007.

*Primary Examiner*—Sarah Song
(74) *Attorney, Agent, or Firm*—McDermott Will & Emery LLP

(57) ABSTRACT

Tensile strength of a tape layer in the lengthwise direction is selected to be higher than adhesive force of the tape layer to optical fiber cores.

Further, position limiting portions 111 by which the positions of a plurality of optical fibers 120 can be limited are formed in a flexible film 110 for tape core assembly which film is used for integrating the plurality of optical fibers 120 as a tape.

Further, a ribbon-like optical fiber core assembly 301 according to the invention including a plurality of optical fiber cores 302 arranged planarly at designated intervals, an adhesive layer 305 disposed so as to surround the optical fiber cores 302, and films 304a and 304b integrated with the optical fiber cores 302 by the adhesive layer 305.

8 Claims, 31 Drawing Sheets

U.S. PATENT DOCUMENTS 5,611,017 A * 3/1997 Lee et al. .................... 385/114
6,148,130 A * 11/2000 Lee et al. .................... 385/100
6,295,400 B1 * 9/2001 Shahid ....................... 385/114

FOREIGN PATENT DOCUMENTS

| | | |
|---|---|---|
| JP | 59-49505 | 3/1984 |
| JP | 63-109911 | 7/1988 |
| JP | 63-200109 | 8/1988 |
| JP | 7-301715 | 11/1995 |
| JP | 9-80279 | 3/1997 |
| JP | 9-236733 | 9/1997 |
| JP | 10-148741 | 6/1998 |

* cited by examiner

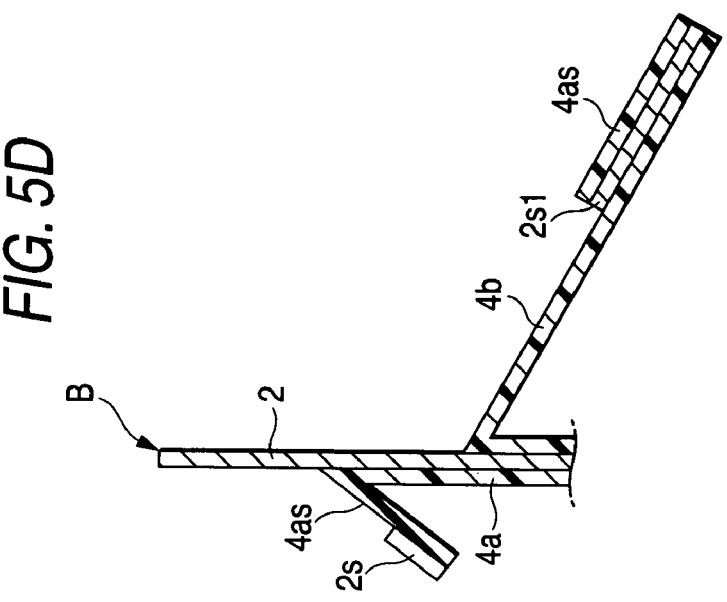
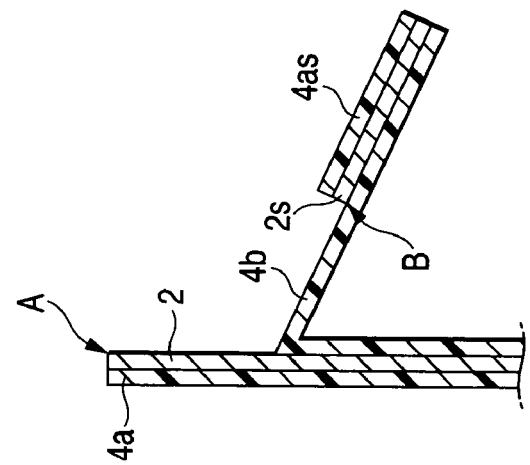
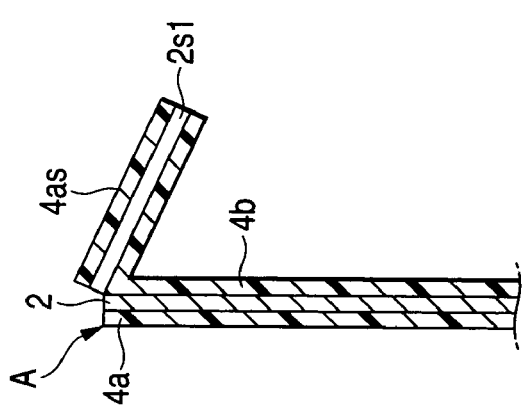
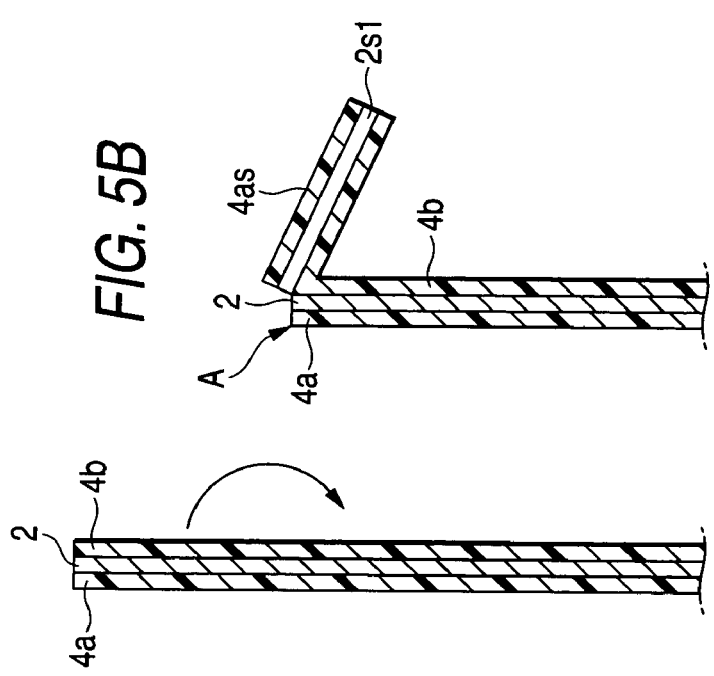

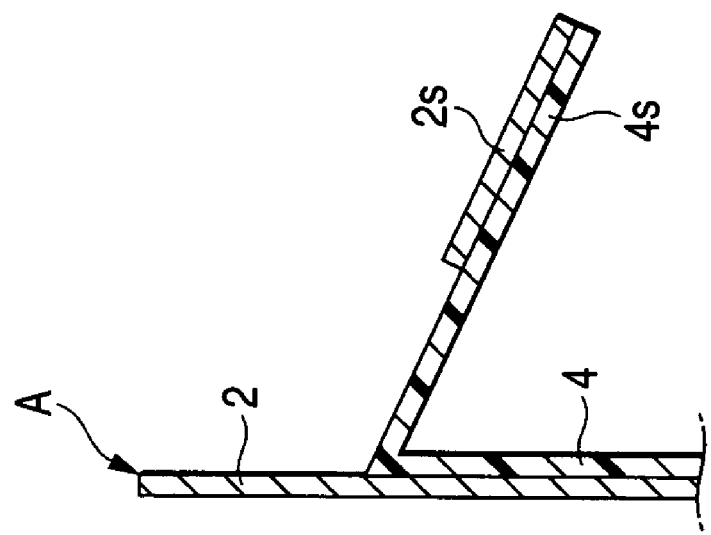
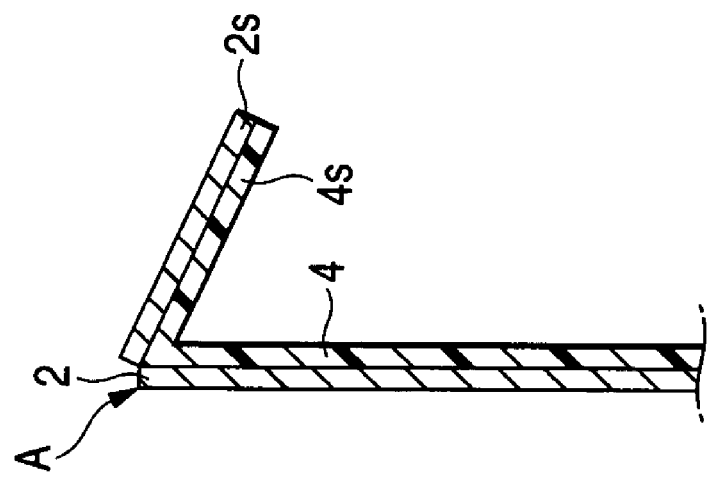
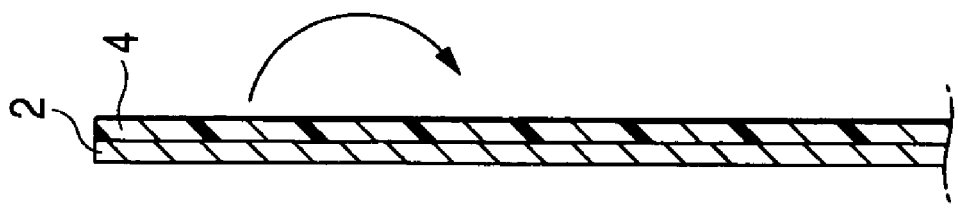

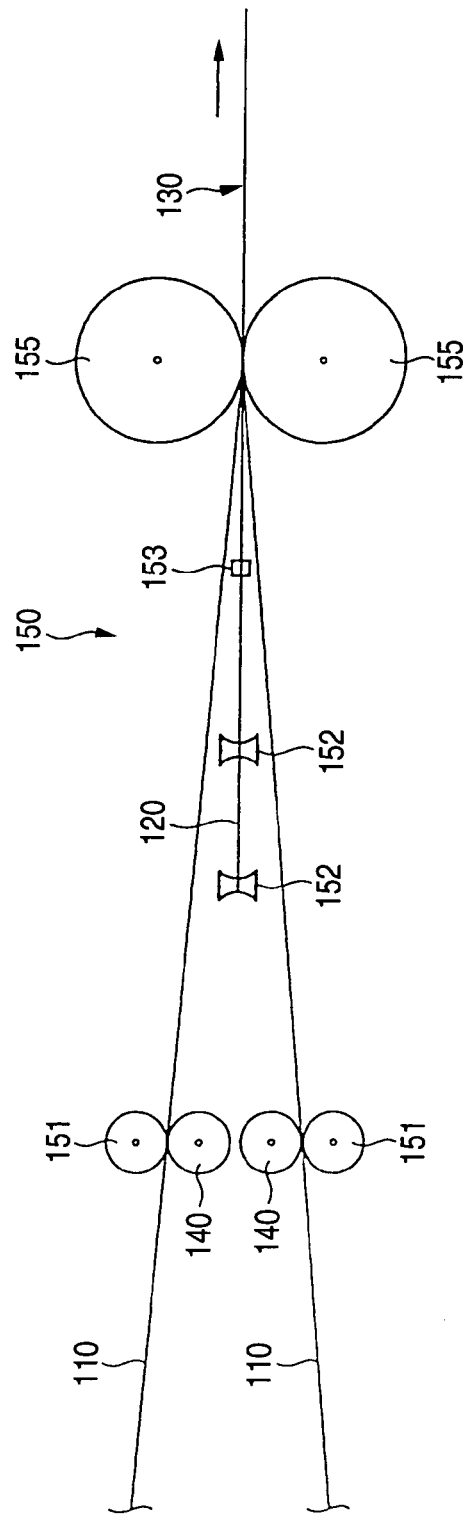
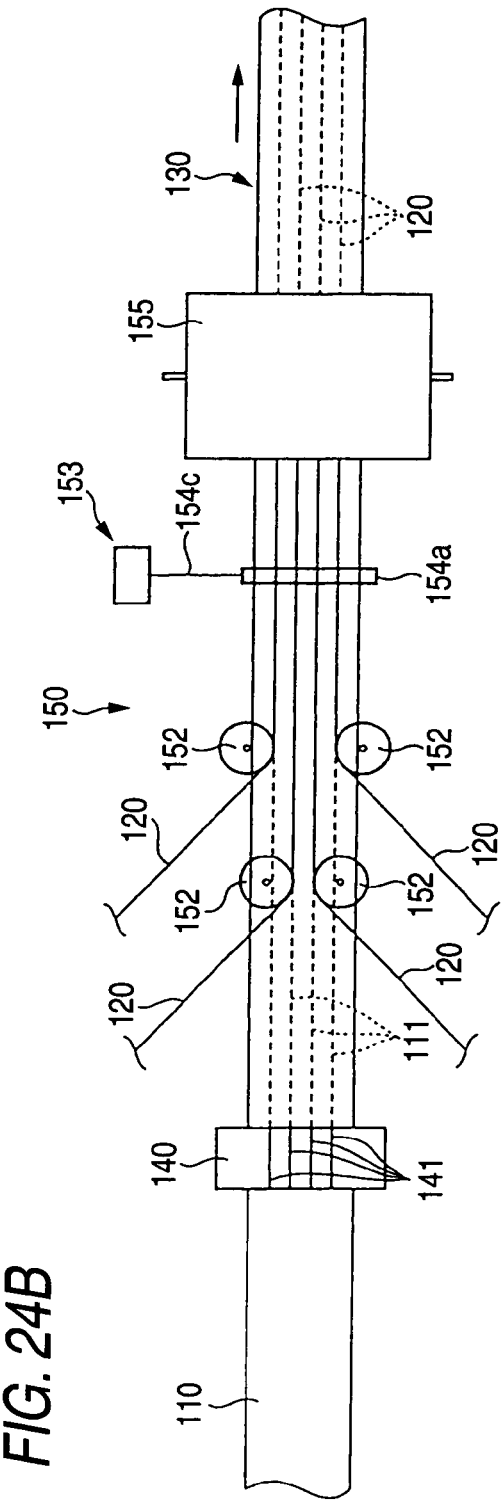
FIG. 24A
FIG. 24B

RIBBON-LIKE OPTICAL FIBER CORE ASSEMBLY, METHOD FOR PRODUCING THE SAME, TAPE CORE ASSEMBLY-CONTAINING CONNECTOR, TAPE CORE ASSEMBLY-CONTAINING OPTICAL FIBER ARRAY, AND OPTICAL WIRING SYSTEM

TECHNICAL FIELD

The present invention relates to a ribbon-like optical fiber core assembly and a method for producing the same and particularly to a ribbon-like optical fiber core assembly that can be easily separated into single cores for branch connection.

Further, the present invention relates to a film for tape core assembly, a tape core assembly and a method for integrating optical fibers as a tape.

Further, the present invention relates to a ribbon-like optical fiber core assembly, a method for producing the same, a tape core assembly-containing connector, a tape core assembly-containing optical fiber array, and an optical wiring system and particularly to a ribbon-like optical fiber core assembly that can be easily separated into single cores for branch connection.

BACKGROUND ART

Optical fibers have been used in internal wiring of apparatus in the vicinities of ordinary homes with the advance of FTTH (Fiber to the Home) in recent years, so that there is a remarkably increasing demand for optical communication. With the advance of optical communication in such circumstances, there is an increasing demand for a multi-core ribbon-like optical fiber core assembly using a plurality of optical fiber tape cores such as 4 cores, 8 cores, 12 cores, 16 cores, 24 cores or 32 cores.

A ribbon-like optical fiber core assembly has been used widely in indoor wiring or internal wiring of apparatus as well as used in an optical cable.

The ribbon-like optical fiber core assembly is used in various forms as follows. In one of the forms, the ribbon-like optical fiber core assembly may be connected to a multi-core connector provided at a terminal in indoor wiring or internal wiring of apparatus. In another form, the ribbon-like optical fiber core assembly may be separated into single cores at an end of the ribbon-like optical fiber core assembly and fanned out (FO) so that the single cores are connected to single-core connectors respectively. In a further form, the ribbon-like optical fiber core assembly is separated into single cores and the single cores may be then rearranged in the form of a tape.

For example, as one form of the multi-core ribbon-like optical fiber core assembly, a thin ribbon-like optical fiber core assembly capable of achieving a multi-core structure has attracted public attention.

In the related art, as shown in FIG. 13A, there is a ribbon-like optical fiber core assembly molded in such a manner that a batch coating layer 6 of a UV-curable resin or a thermoplastic resin is formed on outer circumferences of a plurality of optical fiber cores 2 arranged planarly in a row.

On the other hand, as shown in FIG. 13B, there has been proposed a ribbon-like optical fiber core assembly formed in such a manner that a plurality of optical fiber cores 2 are arranged in parallel without any contact and integrated into one body by a batch coating layer 6 with a varied thickness so that the ribbon-like optical fiber core assembly can be cut at a thin portion of the batch coating layer 6 so as to be separated into respective optical fiber cores which will be attached to an optical connector or the like (e.g., see Patent Document 1).

As described above, both batch coating removability for performing the work of connecting the optical fiber cores efficiently and single core separability for separating the ribbon-like optical fiber core assembly into single cores to perform terminal processing has been particularly required of the ribbon-like optical fiber core assembly in recent years. Generally, in most cases, wiring is performed on the spot. Accordingly, there is a demand for a ribbon-like optical fiber core assembly which can be separated into single cores efficiently without use of any jig.

(Patent Document 1)

JP-A-11-231183 (page 2, FIG. 1)

Further, as a method for integrating optical fibers as a tape, the following technique has been heretofore disclosed (e.g., see Patent Document 2). As shown in FIG. 26A, a plurality of optical fibers 200 are arranged in a horizontal row to form an optical fiber row 201. As shown in FIG. 26B, at least one thermoplastic film 202 (two thermoplastic films 202 in FIG. 26B) is brought into contact with at least one of upper and lower surfaces of the optical fiber row 201 and heated so as to be melted. As shown in FIG. 26C, melted plastic 203 enters in between optical fiber cores, so that the melted plastic 203 serves as a binder for binding the optical fibers in the form of a ribbon.

On the other hand, the necessity of changing the pitch of arrangement of optical fibers has been heretofore described (e.g., see Patent Document 3).

(Patent Document 2)

JP-A-7-43538 (page 2, FIG. 15)

(Patent Document 3)

JP-A-7-218753

The simplest method for integrating a plurality of optical fibers as a tape is a method using a pressure-sensitive adhesive film. In the method, there is a problem that end surfaces of the tape after integration are sticky or adhesive force of the tape varies with time in accordance with deterioration of a pressure-sensitive adhesive agent used in the pressure-sensitive adhesive film. When the aforementioned thermoplastic film 202 is used or when a heat-curable adhesive agent is used, pressure is applied in order to obtain high adhesive force or fulfill adhesion. If the applied pressure is too high, there is a problem that the pitch of arrangement of the optical fibers 200 is disordered due to displacement of the optical fibers 200 as shown in FIG. 27 or an optical fiber 200a at an end portion jumps out. If the applied pressure is insufficient, lowering of adhesive force is brought about.

Further, optical fibers have been used in internal wiring of apparatus in the vicinities of ordinary homes with the advance of FTTH (Fiber to the Home) in recent years, so that there is a remarkably increasing demand for optical communication. Wavelength division multiplexing (WDM) has been introduced as a transmission technique meeting this demand. WDM is a communication system using one optical fiber for transmitting light having a plurality of wavelengths. With the introduction of this system, there is an increasing demand for a multi-core ribbon-like optical fiber core assembly using a plurality of optical fiber cores such as 4 cores, 8 cores, 12 cores, 16 cores, 24 cores or 32 cores in the form of a tape.

Under such circumstances, the ribbon-like optical fiber core assembly has been also used widely in indoor wiring or internal wiring of apparatus.

As one form of the multi-core ribbon-like optical fiber core assembly, a thin ribbon-like optical fiber core assembly capable of achieving a multi-core structure has attracted public attention.

In the related art, as shown in FIG. 41A, there is a ribbon-like optical fiber core assembly molded in such a manner that a batch coating layer of a UV-curable resin or a thermoplastic resin is formed on outer circumferences of a plurality of optical fiber cores 302 arranged planarly in a row. In the related art, as shown in FIG. 41B, there is also a ribbon-like optical fiber core assembly molded in such a manner that the batch coating layer is covered with a tension member k, which is a reinforcing fiber, according to necessity and further covered with a polyvinyl chloride (PVC) resin composition 316.

As shown in FIG. 41C, there has been further proposed a ribbon-like optical fiber core assembly formed in such a manner that a plurality of optical fiber cores 302 are arranged in parallel without any contact and integrated into one body by a batch coating layer 403 so that the pitch of arrangement of the optical fiber cores 302 is made coincident with the pitch of arrangement of photo acceptance elements or terminals of an optical connector to which the optical fiber cores 302 will be attached (e.g., see Patent Document 1).

In this example, adhesion of the tape material to the coatings of the cores needs to be kept high while the lubricity of a surface of the tape material is kept though the tape material is made of one material. Accordingly, there is a problem that selection of the material is limited strictly.

Both batch coating removability for performing the work of connecting the optical fiber cores efficiently and single core separability for separating the ribbon-like optical fiber core assembly into single cores to perform terminal processing are required of the ribbon-like optical fiber core assembly. These two requirements often impose two antithetical characteristics on the coating material. To simultaneously obtain the two antithetical characteristics, there has been further proposed a technique in which pull-out force between a glass fiber and a protective coating layer and adhesive force between the protective coating layer and a batch coating layer are defined as described in JP-A-2000-155248 (e.g., see Patent Document 4).

(Patent Document 4)
JP-A-2000-155248 (paragraphs 30 to 36)

In the case of indoor wiring or internal wiring of apparatus, it is particularly important to take measures against fires. There is an increasing demand for an optical fiber cable having flame retardancy to prevent the spread of the fire.

Two methods are known for making such an optical fiber cable flame-retardant. One of the two methods is a method in which a flame retardant material is used as a coating material per se of the optical fiber cable so that an optical fiber core is coated with the flame retardant material. The other method is a method in which the circumference of the optical fiber cable is covered with a flame retardant material in the condition that the structure of the optical fiber cable per se is left as it is.

The two methods, however, have problems respectively. In the former method, flame retardancy is given to the coating material included in the optical fiber cable. The translucent property of the flame retardant material is however generally not good. For example, the related-art ribbon-like optical fiber core assembly is often molded in such a manner that optical fiber cores are coated with an ultraviolet-curable (UV-curable) resin which is a non-flame-retardant material. If a flame retarder is added to the ultraviolet-curable (UV-curable) resin, transmission of ultraviolet rays is suppressed to make it difficult to cure the UV-curable resin.

For this reason, the ultraviolet-curable resin popularly used cannot be used as the coating material included in the optical fiber cable, so that reduction in production efficiency is unavoidable.

In the latter method, the structure of the optical fiber cable per se is left as it is. For this reason, the total size inevitably increases, so that the method is unsuitable for wiring in a narrow space such as internal wiring of apparatus.

Also a ribbon-like optical fiber assembly (ribbon type optical fiber assembly) faces the same situation as described above.

Generally, the ribbon-like optical fiber assembly uses a structure in which the circumferences of a plurality of single optical cores arranged in parallel are covered with a batch coating layer (tape layer).

When the ribbon-like optical fiber assembly needs to be made flame-retardant, two methods are conceived in the same manner as in the single-core optical fiber cable. One of the two methods is a method in which a flame retardant material is used as the material of the coating or tape layer so that the optical fiber cores are covered with the flame-retardant material. The other method is a method in which the circumference of the ribbon-like optical fiber assembly is further covered with a flame retardant material in the condition that the structure of the ribbon-like optical fiber assembly per se is left as it is.

Like the case of the single-core optical fiber cable, in the former method, if a flame retarder is added to the coating, for example, made of a UV-curable resin in order to obtain flame retardancy, transmission of ultraviolet rays is suppressed to make it difficult to cure the UV-curable resin.

In the latter method, if the ribbon-like optical fiber assembly is coated with a flame retardant material, the total thickness increases so that adverse influence on reduction in size and diameter of apparatus is unavoidable.

DISCLOSURE OF INVENTION

The invention is developed in consideration of such circumstances and an object of the invention is to provide a ribbon-like optical fiber core assembly which can be separated into single cores easily.

Another object of the invention is to provide a ribbon-like optical fiber core assembly which is thin and flame-retardant.

A further object of the invention is to provide a method for separating a ribbon-like optical fiber core assembly into single cores easily, efficiently and without use of any special jig.

Therefore, the invention provides a ribbon-like optical fiber core assembly including a plurality of optical fiber cores arranged planarly, and at least one tape layer for integrating the optical fiber cores into one body, wherein the tape layer has tensile strength higher than adhesive force of the tape layer to the optical fiber cores.

The term "tensile strength" used herein means tension just before breaking when pulling force is applied on the tape layer in the lengthwise direction.

According to this configuration, because the tensile strength of the tape layer is higher than the adhesive force of the tape layer to the optical fiber cores, the tape layer can be peeled easily when a front end side viewed from a breaking portion is pulled along a remaining portion of the tape layer after part of the tape layer is broken at a predetermined position. Accordingly, the work of separating the ribbon-like optical fiber core assembly into single cores becomes easy. Incidentally, the ribbon-like optical fiber core assembly is bent locally to thereby break the tape layer at the predetermined position. It is a matter of course that the ribbon-like optical fiber core assembly may be bent with a radius smaller than the smallest bending radius of each optical fiber core so that the tape layer and the optical fibers can be broken simultaneously.

Breaking of the tape layer is performed by the optical fiber cores' piercing the tape material outside of flexural deformation or triggered by a scratch which is formed in advance on the outside of the tape layer to be bent. When the front end side viewed from the breaking portion is grasped and moved along the optical fiber cores so that the tape layer located inside is peeled, the tape layer can be peeled from the optical fiber cores so that the optical fiber cores can be taken out.

Preferably, the tape layer includes a film base, and an adhesive layer. According to this configuration, when suitable materials are selected and designed, both tensile strength and adhesive force of the tape layer can be selected easily to obtain more desirable characteristic.

Preferably, part or all of the adhesive layer may contain a heat-curable resin. According to this configuration, the heat-curable resin can be cured well without distortion at the time of curing, so that a ribbon-like optical fiber core assembly thin and high in strength can be obtained. In addition, flame retardancy can be given to the adhesive layer efficiently because the heat-curable resin can be crosslinked/cured together with a flame retarder efficiently.

Part or all of the adhesive layer may contain a thermoplastic resin. According to this configuration, the thermoplastic resin can be fluidized by heating so as to be cured well without distortion, so that a ribbon-like optical fiber core assembly thin and high in strength can be obtained. In addition, flame retardancy can be given to the adhesive layer efficiently because the thermoplastic resin contained in the adhesive layer can be cured together with a flame retarder.

Part or all of the adhesive layer may contain a pressure-sensitive adhesive resin. According to this configuration, bonding can be performed well by only pressurizing without heating. Even at the time of peeling, the tape layer can be peeled easily when force enough to overcome the adhesive force of the adhesive layer is applied on the tape layer or when the adhesive force of the adhesive layer is weakened by heating.

Efficiency in wiring, however, may be worsened if the outer surface of the ribbon-like optical fiber core assembly per se is adhesive.

It is therefore preferable that the outer surface of the ribbon-like optical fiber core assembly is as lubricant and non-adhesive as possible.

When a tape layer having a film base, and an adhesive layer formed on a surface of the film base is used so that the adhesive layer is not exposed at the outer surface of the ribbon-like optical fiber core assembly, the worsening of transmission characteristic can be prevented.

The tape layer may be formed according to the required grade of flame retardancy so that either of the film base and the adhesive layer has flame retardancy. According to this configuration, the ribbon-like optical fiber core assembly can be formed so as not to be remarkably thick in spite of high flame retardancy compared with the related-art ribbon-like optical fiber core assembly. Both reduction in size and increase in density can be attained according to reduction in size of apparatus.

Preferably, the ribbon-like optical fiber core assembly may be formed to have flame retardancy defined in UL1581VW-1. UL1581VW-1 is used as a standard for deciding flame retardancy of apparatus or flame retardancy of a cable or cord laid in the apparatus. This test is provided for evaluating the spread of the fire in the condition that the cable or cord is burned actually. This test is established as a method capable of obtaining evaluation results approximate to real fires.

When the optical fiber cores contain colored layers respectively, the optical fiber cores can be easily distinguished from one another at the time of branch connection. If all the optical fiber cores forming the ribbon-like optical fiber core assembly contain colored layers of different colors respectively, it is easy to distinguish the optical fiber cores from one another. If at least one of the optical fiber cores except the optical fiber core located in the center of the ribbon-like optical fiber core assembly is different in color from the other optical fiber cores, the direction of arrangement of the optical fiber cores can be detected easily to prevent mistaken connection.

Preferably, in this case, at least one part of the film base may be light-transmissive. According to this configuration, the sequence of arrangement of the optical fiber cores can be detected easily on the basis of the colored layers detected from the outside.

When the film base is not light-transmissive, an identification mark may be provided on the surface of the tape material so that the sequence of arrangement of the optical fiber cores can be detected.

In the condition that the optical fiber cores arranged planarly are wound with the film bases so as to be covered with the film bases, the film bases may be bonded to each other so that bonding ends are exposed at end portions of the film bases. According to this configuration, the film bases can be peeled easily from the bonding ends while coating protection can be kept good.

When end surfaces of the film bases are exposed at positions near ends of the row of optical fiber cores arranged planarly, the end surfaces of the film bases serve as non-bonded regions so that the film bases can be peeled easily from the non-bonded regions.

The ribbon-like optical fiber core assembly configured as described above or the ribbon-like optical fiber core assembly formed by the aforementioned method may be connected to a multi-core connector to form a connector-containing tape core assembly. Also in the connector-containing tape core assembly, branch connection can be performed easily and effectively in the middle of the tape core assembly portion.

The ribbon-like optical fiber core assembly may be connected to an all-resin multi-core optical ferrule molded of a flame retardant resin to form a connector-containing tape core assembly effectively. Particularly light with large power of hundreds of mW or higher may be used in a transmission path with the development of the Raman amplification technique etc. in recent years. Even if an alien substance etc. is deposited on a connection portion in this case, the bottom serves as a heating source so that there is a risk of causing a fire when things come to the worst. Such contingencies can be prevented when both the tape core assembly and the ferrule which are in direct contact with the optical fibers are made flame-retardant. Preferably, flame retardancy required of the resin material of the ferrule satisfies the V-0 grade of UL94.

The invention also provides a method of separating the ribbon-like optical fiber core assembly into single cores, including the steps of: peeling at least one portion of the tape layer; and applying pulling force on the tape layer in a direction of detachment from the optical fiber cores to thereby peel the tape layer up to a predetermined position.

In the case of a ribbon-like optical fiber core assembly having opposite surfaces on which tape layers are formed, the ribbon-like optical fiber core assembly can be easily separated into single cores by an operation of peeling one tape layer by the method and then peeling the other tape layer by the same method.

For example, the invention may provide a method including the steps of: bending the ribbon-like optical fiber core assembly locally with a radius smaller than the smallest bending radius of each optical fiber from one of surfaces of arrangement of the optical fiber cores so that at least one part of the tape layer located in the inner surface with respect to the breaking direction is kept non-broken while at least the optical fiber cores are broken (breaking step); and peeling the tape layer up to a predetermined position inward from the breaking surface by applying pulling force on the tape layer kept non-broken in the direction of detachment from the optical fiber cores through the front end side of the optical fiber cores viewed from the breaking surface (peeling step).

The invention may provide a method of separating a ribbon-like optical fiber core assembly having optical fiber cores arranged planarly in a row and integrated into one body by tape layers disposed on opposite surfaces of the row of optical fiber cores, including the steps of: bending the ribbon-like optical fiber core assembly with the smallest bending radius of each optical fiber from the first surface of the row of optical fiber cores so that the tape layer located on the second surface side opposite to the first surface is kept non-broken while the optical fiber cores are broken together with the tape layer located on the first surface side of the row of optical fiber cores (first breaking step); peeling the tape layer up to a predetermined position inward from the breaking position by applying pulling force on the tape layer kept non-broken in the direction of detachment from the optical fiber cores through the front end side of the optical fiber cores viewed from the breaking position (first peeling step); bending the surfaces of the row of optical fiber cores locally with a radius smaller than the smallest bending radius of each optical fiber from the second surface of the row of optical fiber cores so that the tape layer located on the first surface side is kept non-broken while the optical fiber cores of the ribbon-like optical fiber core assembly peeled are broken inward from the predetermined position (second breaking step); peeling the tape layer by applying pulling force on the tape layer kept non-broken in the direction of detachment from the optical fiber cores through the front end side of the optical fiber cores viewed from the breaking surface (second peeling step); and extracting the optical fiber cores.

Further, an object of the invention is to provide a film for tape core assembly, a tape core assembly and a method for integrating optical fibers as a tape, in which optical fibers can be integrated as a tape surely without disorder of the pitch of arrangement of the optical fibers.

To achieve the foregoing object, the invention provides a film for tape core assembly including a flexible film capable of integrating a plurality of optical fibers as a tape, wherein the flexible film includes position limiting portions formed so that the positions of the plurality of optical fibers can be limited.

In the film for tape core assembly configured as described above, when a plurality of optical fibers are to be integrated as a tape by use of the film, the optical fibers are integrated as a tape in the condition that the optical fibers are positioned by the position limiting portions provided in the film for tape core assembly, that is, in the condition that the optical fibers cannot move. Accordingly, the optical fibers can be retained at intervals of a predetermined pitch.

Preferably, in the film for tape core assembly according to the invention, the position limiting portions are formed so that the pitch of arrangement of the position limiting portions at one end portion of the film for tape core assembly is different from the pitch of arrangement of the position limiting portions at the other end portion of the film for tape core assembly.

In the film for tape core assembly configured as described above, because the pitch of arrangement of the position limiting portions at one end portion of the film for tape core assembly is different from the pitch of arrangement of the position limiting portions at the other end portion of the film for tape core assembly in the lengthwise direction, a tape can be formed in such a manner that optical fiber pitches at opposite ends of the tape are different in the lengthwise direction.

Further, the invention is developed in consideration of such circumstances and an object of the invention is to provide a ribbon-like optical fiber core assembly which is good in coating removability so that a batch coating can be removed and which can be easily separated into single cores.

Another object of the invention is to provide a ribbon-like optical fiber core assembly which is thin and flame-retardant.

A further object of the invention is to provide a method for producing a highly reliable ribbon-like optical fiber core assembly easily and efficiently.

Therefore, the invention provides a ribbon-like optical fiber core assembly including a plurality of optical fiber cores arranged planarly, at least one film base, and an adhesive layer, wherein: the plurality of optical fiber cores are disposed so that gaps are formed between adjacent ones of the optical fiber cores respectively; the adhesive layer is interposed in the gaps so that the gaps are filled with the adhesive layer; and the film base is provided so that the plurality of optical fiber cores and the adhesive layer are covered with the film base.

According to the result of the inventors' eager examination, it has been found that the following technique is effective in preventing peeling of core coatings from causing worsening of removability at the time of removal of the batch coating. That is, an adhesive layer having firm adhesion to the core coatings is interposed between the core coatings so that the core coatings can be prevented from coming into contact with one another. As a result, peeling at the interface between each core coating and the batch coating can be prevented from going on in the sectional direction while spreading on the interface.

Incidentally, it has been known that if each surface of the ribbon-like optical fiber core assembly per se is adhesive, there arises a problem that efficiency in wiring operation is worsened or transmission characteristic is worsened because two or more ribbon-like optical fiber core assemblies adhere to each other when the ribbon-like optical fiber core assemblies are piled up.

It is therefore preferable that each surface of the ribbon-like optical fiber core assembly is as good in lubricity as possible and non-adhesive.

To solve the problem in worsening of transmission characteristic, it is preferable that the core coatings and the adhesive layer are enclosed in a non-adhesive film base provided separately from the adhesive layer.

When a film having a film base, and an adhesive layer formed on one surface of the film base is used so that the adhesive layer is not exposed at an outer surface of the ribbon-like optical fiber core assembly, the worsening of transmission characteristic can be prevented.

Preferably, the adhesive layer is enclosed in the film base so that the adhesive layer is not exposed at the outer surface of the ribbon-like optical fiber core assembly.

That is, preferably, in the ribbon-like optical fiber core assembly according to the invention, an adhesive layer is interposed between optical fiber cores and the circumference of the adhesive layer is covered with film bases to thereby form a batch coating layer.

According to this configuration, adhesion between each core coating and the batch coating can be made firm while lubricity of each surface of the ribbon-like optical fiber core assembly is kept good. Furthermore, because the core coatings of the cores can be prevented from coming into contact with one another, the structure is different from that shown in FIG. 41A. That is, when the batch coating needs to be removed from the ribbon-like optical fiber core assembly, chain peeling can progress at the interfere between each core coating and the batch coating. As a result, worsening of coating removability can be prevented.

On the other hand, separation of a ribbon-like optical fiber core assembly into single cores can be easily achieved when the fiber cores are separated from one another after the film bases are peeled.

As means for obtaining the aforementioned configuration, there may be used a method in which adhesive layers are provided on optical fiber core side surfaces of the film bases respectively in advance so that the plurality of optical fiber cores arranged in parallel are compression-bonded to the film bases through the adhesive layers to thereby interpose the adhesive agent between the optical fiber cores. This method is very useful in terms of production efficiency because filling of the gaps with the adhesive layers and enclosure of the adhesive layers in the film bases can be achieved.

In this case, the required minimum amount of the adhesive agent can be decided by suitable adjustment of the thickness of the adhesive layer in each film used, the pitch of arrangement of the optical fiber cores and the pressure at compression bonding so that the required minimum amount of the adhesive agent can be interposed between the optical fiber cores after bonding. Theoretically, if the amount of the adhesive agent excluded by the optical fiber cores is just equal to the amount of the adhesive agent with which the gaps between the optical fiber cores are filled after compression bonding, the gaps between the optical fiber cores can be entirely filled with the adhesive agent.

In a portion where the film base abuts on a surface of the parallel arrangement of optical fiber cores, the adhesive agent may remain according to the degree of compression bonding. Or this portion may be formed so that the core coatings are in direct contact with the film base. Generally, it is preferable that the thickness of the adhesive agent in this portion is small enough to hold recognizability of the optical fiber cores and prevent the tape core assembly per se from becoming thicker than required. It is however practically insignificant that a small amount of the adhesive layer remains in the interface between the film base and each optical fiber core. However, if the adhesive layer is so thick that the optical fiber cores may be buried in the adhesive layer when the film base is peeled, the optical fiber cores can hardly be peeled one by one so that single core separability is worsened. When the thickness of the thinnest portion of the adhesive layer is smaller than 10% of the outer diameter of each optical fiber core, single core separability is not worsened and there is no problem from the point of view of recognizability and working efficiency.

That is, because the film has a film base, and an adhesive layer for sticking the film base to the optical fiber cores, the ribbon-like optical fiber core assembly can have a thickness approximately equal to the sum of the diameter of each optical fiber core and the thickness of the film base. Accordingly, a thin ribbon-like optical fiber core assembly can be provided.

The film may be formed so that either of the film base and the adhesive layer has flame retardancy in accordance with the required grade of flame retardancy. Accordingly, the ribbon-like optical fiber core assembly can be formed so as to be not remarkably thick in spite of high flame retardancy compared with the related-art ribbon-like optical fiber core assembly. As a result, reduction in size and increase in density can be attained in accordance with reduction in size of apparatus. The term "flame retardant material" means a material such as a resin having flame retardancy. On the other hand, the term "flame retarder" means an additive which cannot form a structure in itself but can give flame retardancy to a non-flame-retardant base material when the flame retarder is added to the non-flame-retardant base material.

Preferably, the optical fiber cores are arranged at designated intervals. In this case, the optical fiber cores are fixed so that the adhesive layer enters in between the optical fiber cores well. Accordingly, the adhesion of each core coating to the film is made stronger.

The invention also provides a method of producing a ribbon-like optical fiber core assembly, including the steps of: arranging a plurality of optical fiber cores planarly; and covering the arranged optical fiber cores with film bases after bonding the arranged optical fiber cores to one another by an adhesive layer so that the adhesive layer is interposed between the arranged optical fiber cores.

According to the method, the plurality of optical fiber cores are bonded with the film bases so that the adhesive layer is interposed between the optical fiber cores. Accordingly, there can be provided a thin ribbon-like optical fiber core assembly which is strong and good both in batch coating removability and in single core separability. Incidentally, when bonding is performed with compression, bonding can be completed well.

If the adhesive layer is formed on a surface of each film base in advance, bonding can be performed easily.

The ribbon-like optical fiber core assembly configured as described above or the ribbon-like optical fiber core assembly formed by the aforementioned method may be applied so that the ribbon-like optical fiber core assembly is connected to a multi-core connector to form a tape core assembly-containing connector. Also in the tape core assembly-containing connector, branch connection in the middle of the tape core assembly portion can be performed easily and effectively.

In addition, the ribbon-like optical fiber core assembly configured as described above or the ribbon-like optical fiber core assembly formed by the aforementioned method may be applied effectively so that the ribbon-like optical fiber core assembly is connected to a fiber array to form a tape core assembly-containing fiber array.

BRIEF DESCRIPTION OF DRAWINGS

FIGS. 5A to 5D are views showing a method for separating the ribbon-like optical fiber core assembly according to the first embodiment of the invention into single cores.

FIGS. 9A to 9C are views showing a method for separating the ribbon-like optical fiber core assembly according to the fourth embodiment of the invention into single cores.

FIG. 24A is a front view of tape-forming apparatus for carrying out a method for integrating optical fibers as a tape according to the invention; and FIG. 24B is a plan view of the tape-forming apparatus.

BEST MODE FOR CARRYING OUT THE INVENTION

FIRST EMBODIMENT

A ribbon-like optical fiber core assembly according to the invention will be described below in detail with reference to the drawings.

Figure 1:
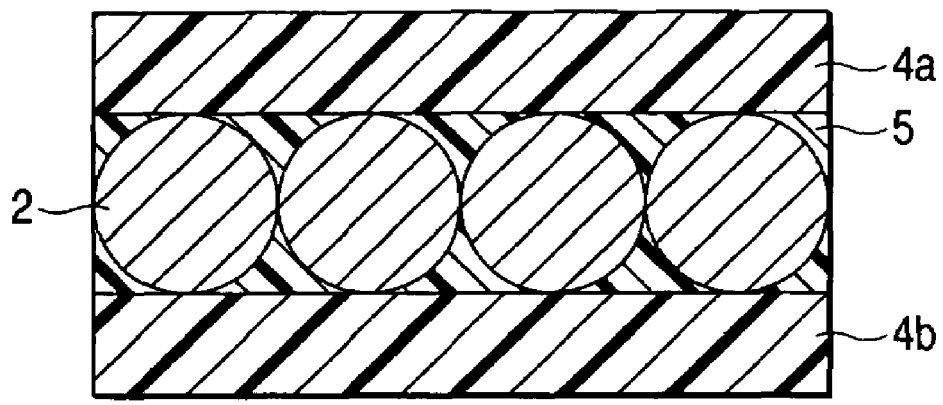
FIG. 1 is a sectional view showing a ribbon-like optical fiber core assembly according to a first embodiment of the invention.

FIG. 1 is a sectional view showing a ribbon-like optical fiber core assembly according to the invention.

As shown partially and roughly in FIG. 1, the ribbon-like optical fiber core assembly 1 according to this embodiment includes: 8 optical fiber cores 2 (in which only 4 cores are shown in FIG. 1) each having a glass fiber diameter of 25 μmΦ and a core coating diameter R of 250 μmΦ are arranged planarly in a row; an adhesive layer 5 made of a polyolefin resin added with a bromic flame retarder as a flame retarder and disposed on the outer circumferences of the optical fiber cores 2; and film bases 4a and 4b made of polyester films and disposed so that the outer circumference of the ribbon-like arrangement of the optical fiber cores 2 is sandwiched between the film bases 4a and 4b while the outer circumferences of the optical fiber cores 2 are surrounded by the adhesive layer 5. In this embodiment, the thickness of each of the film bases is selected to be 25 μm whereas the thickness of the adhesive layer is selected to be 30 μm.

In this embodiment, the adhesive force of the tape layer constituted by the film base and the adhesive layer to the optical fiber cores is 100 g per 8 cores and the tensile strength of the tape layer is not smaller than 600 g per 8 cores.

The tensile strength of the tape layer can be adjusted when the materials and thicknesses of the film bases and the adhesive layer are adjusted. On the other hand, breaking of the optical fiber cores can be prevented when the composition of the adhesive layer is adjusted.

Figure 2A:
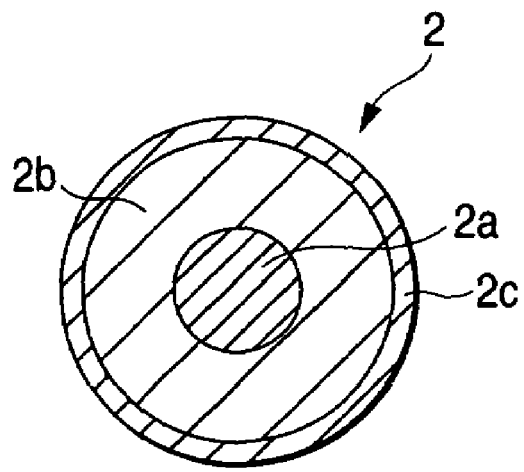
FIGS. 2A and 2B are enlarged views showing main portions of examples of an optical fiber core in the ribbon-like optical fiber core assembly.
Figure 2B:
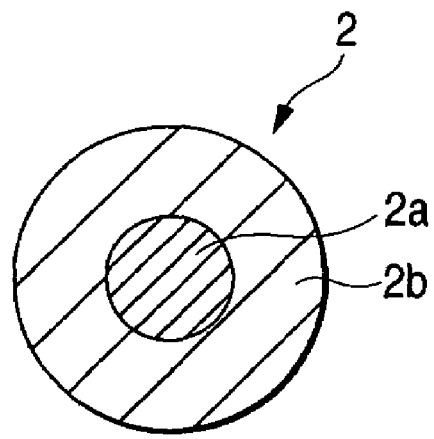

The ribbon-like optical fiber core assembly 1 is formed in such a manner that the circumference of arrangement of the 8 optical fiber cores 2 arranged planarly in a horizontal row is compression-bonded to the film bases 4a and 4b of polyester films through the adhesive layer 5. As shown in FIG. 2A which is an enlarged view, a quartz single mode or multi-mode optical fiber core, which includes a glass fiber 2a having a core and a clad, and a coating 2b for covering the circumference of the glass fiber 2a, is used as each of the optical fiber cores 2. The reference numeral 2c designates a colored layer. Although this embodiment shows the case where a quartz multi-mode optical fiber core is used, the invention is not limited thereto. For example, a polymer-clad optical fiber or a plastic optical fiber may be used as each of the optical fiber cores 2. As shown in FIG. 2B, the colored layer 2c may be dispensed with. That is, optical fiber cores each having the glass fiber 2a and the coating 2b without the colored layer 2c may be mixed with optical fibers each further having the colored layer 2c. In this case, the optical fiber cores may be disposed asymmetrically so that the sequence of arrangement of the optical fiber cores can be specified.

A method for producing the ribbon-like optical fiber core assembly according to this embodiment will be described below.

Figure 3A:
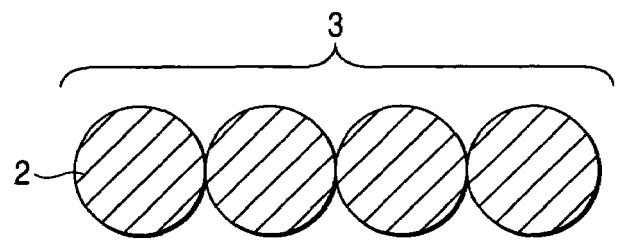
FIGS. 3A to 3C are procedural views showing a process for producing the ribbon-like optical fiber core assembly.
Figure 8:
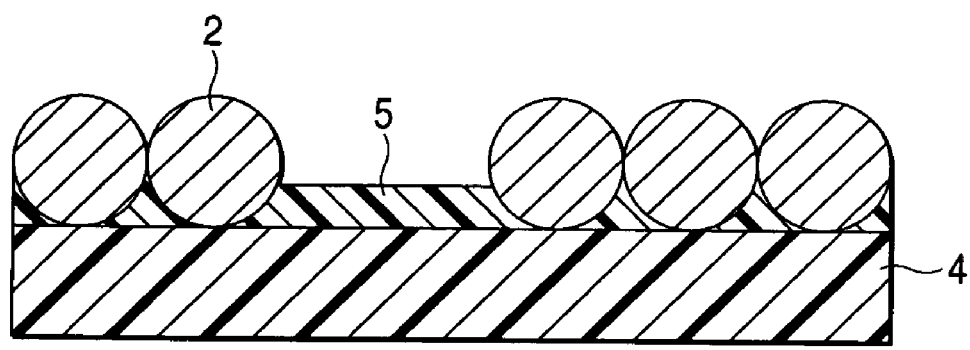
FIG. 8 is a sectional view showing a ribbon-like optical fiber core assembly according to a fourth embodiment of the invention.
Figure 10:
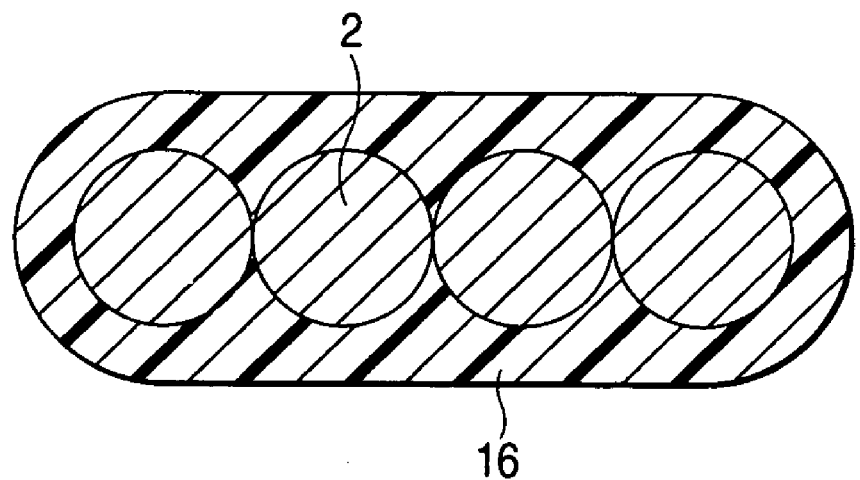
FIG. 10 is a sectional view showing a ribbon-like optical fiber core assembly according to a fifth embodiment of the invention.

First, as shown in FIG. 3A, 8 optical fiber cores 2 (in which only four cores are shown in FIG. 3A) are arranged planarly.

Figure 3B:
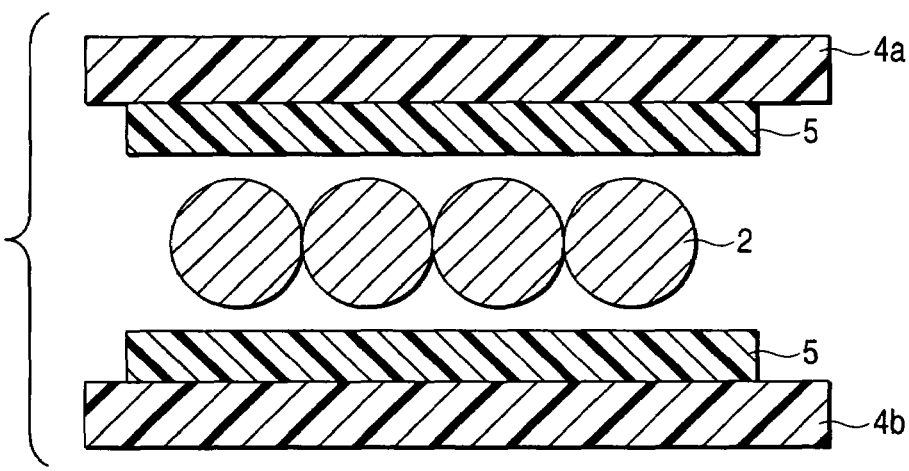
Figure 3C:
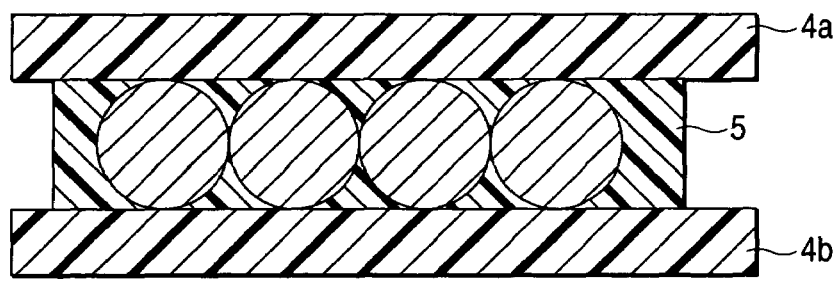

Then, as shown in FIG. 3B, a thermoplastic adhesive layer 5 made of a polyolefin resin having a thickness of about 30 μm and added with a bromic flame retarder is applied on a surface of each film base 4a, 4b made of a polyester resin with a thickness of 25 μm. The arranged optical fiber cores 2 are sandwiched between the film bases 4a and 4b and compression-bonded to the film bases 4a and 4b as shown in FIG. 3C.

Figure 4:
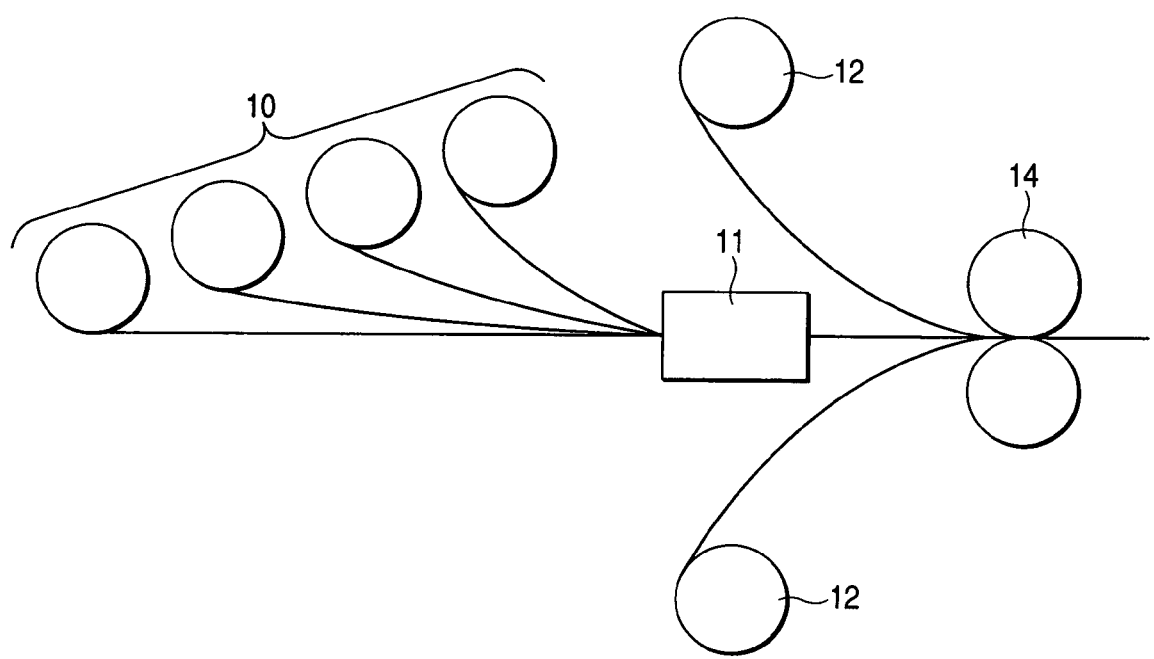
FIG. 4 is a sectional view showing apparatus for producing the ribbon-like optical fiber core assembly.

FIG. 4 is a typical view showing apparatus for producing the ribbon-like optical fiber core assembly. In the apparatus, four optical fiber cores 2 are paid out from reels 10 respectively while drawn up successively. The four optical fiber cores 2 are aligned planarly in a row by an alignment portion 11 so that the pitch of arrangement of the optical fiber cores 2 is adjusted. Adhesive layer 5—containing film bases 4a and 4b are paid out from tape reels 12 and 13 respectively. The film bases 4a and 4b are heated by a heating portion 14. Then, the film bases 4a and 4b are cooled and cured. A breaking assisting line-forming portion may be provided on the downstream side of the heating portion 14 so that breaking assisting lines arranged at designated intervals can be formed in each film base. In this case, the ribbon-like optical fiber core assembly can be separated into single cores more easily.

In the ribbon-like optical fiber core assembly formed in this manner, the tensile strength of the film as the tape layer is not lower than 30 N/cm, that is, selected so as to be higher than the adhesive force of the tape layer to the optical fiber cores. Accordingly, the ribbon-like optical fiber core assembly can be easily separated into single cores.

A method for separating the ribbon-like optical fiber core assembly into single cores will be described below.

First, as shown in FIG. 5A, the ribbon-like optical fiber core assembly is prepared.

Then, as shown in FIG. 5B, the ribbon-like optical fiber core assembly is bent at a position A far by a predetermined distance from an end so that the film base 4a located on the first surface side of the row of optical fiber cores is broken. On the other hand, the film base 4b located on the second surface side opposite to the first surface side is kept non-broken. On this occasion, the optical fiber cores 2 are broken together with the film base 4a at the position A. The adhesive agent 5 may remain on a peeled portion of the film base 4a.

Then, as shown in FIG. 5C, the optical fiber cores 2s, the film bases 4as and 4b on the front end side viewed from the breaking surface of the optical fiber cores 2 are grasped and moved in the direction of detachment from the optical fiber cores to peel the side kept non-broken. In this manner, the tape layer constituted by the film base 4b is peeled downward from the breaking position A to a predetermined position.

Then, as shown in FIG. 5D, after the tape layer constituted by the film base 4b and the adhesive layer and located on one surface has been already peeled at an end, the optical fiber cores 2 are broken at a position B below the position A. On the other hand, the tape layer located on the first surface side and constituted by the film base 4a and the adhesive layer is kept non-broken. On this condition, the film base 4as and the optical fiber cores 2s on the front end side viewed from the breaking surface of the optical fiber cores are grasped and moved in the detection of detachment from the optical fiber cores 2 to peel the film base 4a kept non-broken. In this manner, the tape layer constituted by the film base 4a and the adhesive layer is peeled to a predetermined position so that the optical fiber cores can be taken out. The peeled tape layer may be cut at a predetermined position.

In this manner, the ribbon-like optical fiber core assembly can be separated into single cores efficiently without use of any special jig.

Incidentally, breaking grooves (notches) may be formed at bonding ends between the film bases so that the film bases can be peeled from the breaking grooves.

In the ribbon-like optical fiber core assembly according to this embodiment, each tape layer is constituted by a film base and an adhesive layer. Accordingly, while flame retardancy is given to either of the film base and the adhesive layer, the thicknesses and compositions of the film base and the adhesive layer can be adjusted easily so that the tensile strength of the tape layer is higher than the adhesive force of the adhesive layer to the optical fiber cores.

A polyester resin is used as each of the film bases forming the skin of the ribbon-like optical fiber core assembly 1 according to this embodiment.

A polyolefin resin added with a bromic flame retarder is used as the adhesive layer. Bromine is contained in the flame retarder used for improving the flame retardancy of the polyolefin resin. For example, a bromic aromatic compound flame retarder can be used as the flame retarder. When the bromic flame retarder is added to the polyolefin resin, the resin can be made not only flame-retardant but also low smoke-emissive.

The adhesive agent may further contain antimony for obtaining flame retardancy. For example, antimony trioxide may be used as a compound containing antimony. Antimony trioxide is a flame-retarding assistant. Although it is almost impossible to obtain any flame-retarding effect when only antimony trioxide is added to a resin, a higher grade of flame retardancy can be attained when antimony trioxide is used in combination with a bromic flame retarder as represented by the polyolefin resin composition described in this embodiment. The polyolefin resin composition fulfills a function of stopping a thermal decomposition chain reaction, a function of blocking oxygen and a function of accelerating carbonization on the basis of the synergistic effect of antimony trioxide and a bromic compound.

As described above, flame retardancy high enough to pass a UL1581VW-1 vertical flame-retarding test is required of cables or cords disposed in apparatus.

The UL1581VW-1 vertical flame-retarding test will be described below.

Figure 14:
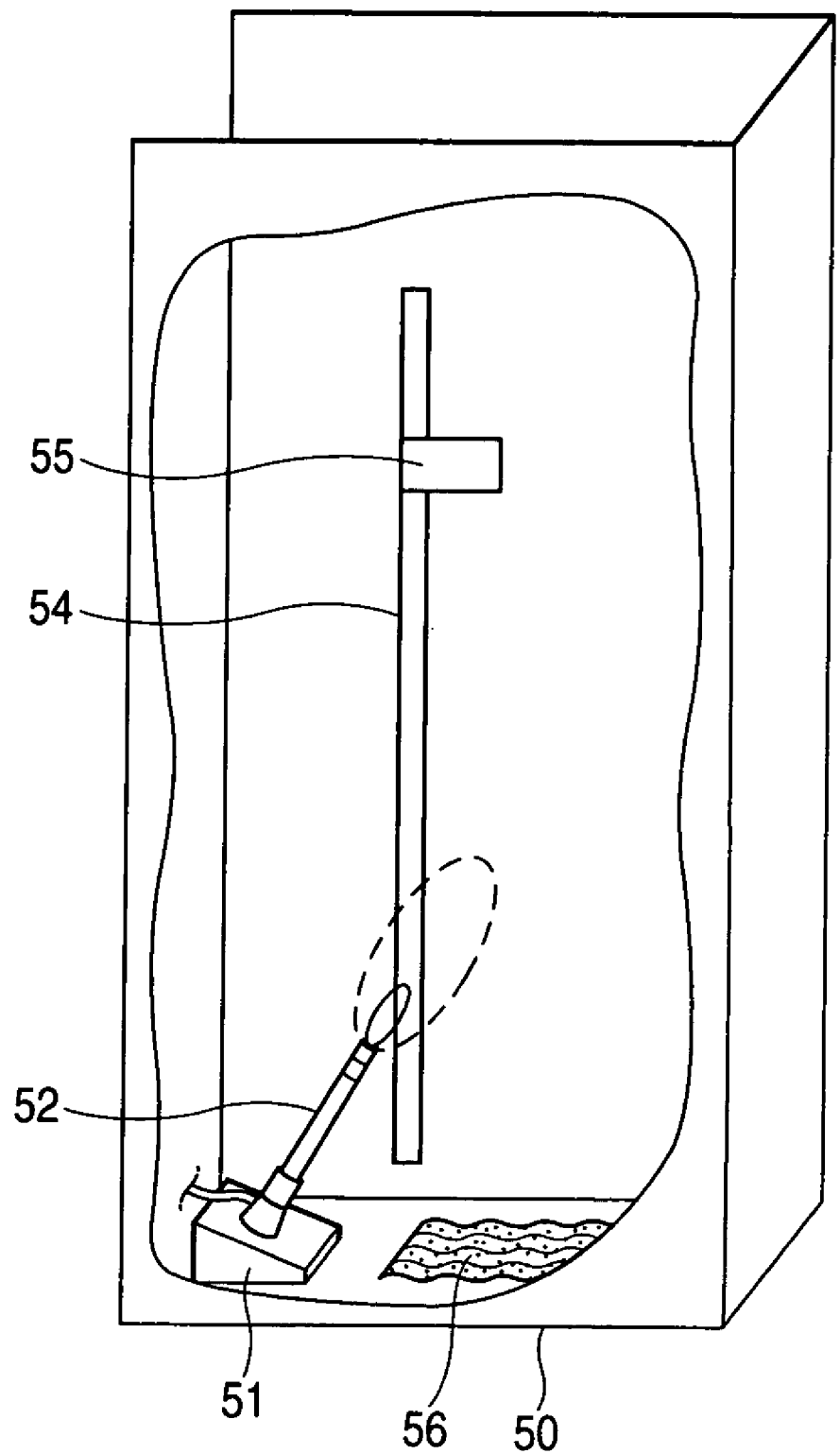
FIG. 14 is a schematic view of a flammability tester.

The UL1581VW-1 vertical flame-retarding test is positioned as the strictest one of flammability tests applied to cables or cords disposed in apparatus. A ribbon-like optical fiber core assembly about 457 mm long is used as a sample 54 to be evaluated by the test. FIG. 14 schematically shows a UL1581VW-1 vertical flame-retarding tester.

As shown in FIG. 14, the UL1581VW-1 vertical flame-retarding tester has a test box 50 made of iron and provided with surge cotton 56 spread in the test box 50, a stand 51, and a gas burner 52 set on the stand 51 so as to be inclined at an angle of about 20 degrees. The UL1581VW-1 vertical flame-retarding tester is used for examining flammability of the sample and burn-up of the surge cotton.

That is, in the tester, in the condition that a flag 55 is attached to the ribbon-like glass fiber core assembly serving as the sample 54, the gas burner 52 is set in the test box 50 so that flame is applied to a position 76 mm distant from the lower portion of the sample 54 at an angle of about 20 degrees. A cycle of firing for 15 seconds and interruption for 15 seconds is repeated five times. Incidentally, if the sample is burning for a time longer than 15 seconds during the interruption, the gas burner 52 is fired up immediately after the fire is extinguished.

On this occasion, the burning time during the interruption and the burning time after the completion of the five cycles are measured actually, so that the burning of the flag (kraft paper based on JIS Z1511) 55 and the burning of the surge cotton due to the fall of burning fragments of the sample 54 are measured.

Using the tester configured as described above, evaluation is made on the basis of the following criterion.

(i) The burning time is not longer than 60 seconds.

(ii) The burned-out or scorched area of the flag is not larger than 25%.

(iii) Flaming drops to burn the surge cotton are prevented from falling from the sample to the surge cotton.

The three points are checked by eye observation.

As described above, in the ribbon-like optical fiber core assembly 1 according to this embodiment, a polyester resin, preferably a polyethylene terephthalate resin, is used as the film base whereas a bromic flame retarder is contained in the adhesive layer or a polyolefin resin added with a bromic flame retarder is used as the adhesive layer. As a result, the ribbon-like optical fiber core assembly 1 can satisfy the flame spread rating defined in the UL1581VW-1 vertical flame-retarding test. Furthermore, because the polyester resin, preferably the polyethylene terephthalate resin, and the polyolefin resin are inexpensive and good in processability, both production cost and product cost can be suppressed to be low.

In addition, because antimony is added to the polyolefin resin added with the bromic flame retarder, the flame retardancy of the ribbon-like optical fiber core assembly 1 can be improved more greatly.

Incidentally, because tensile strength per unit thickness varies when the resin material is changed, the thickness of the film may be adjusted so that the tensile strength is higher than adhesive force.

Incidentally, the adhesive layer may contain the polyolefin resin, and additives such as a plasticizer, a stabilizer, etc. other than the flame retarder. EVA, polyester, or the like, may be used as another resin than the polyolefin resin added with the bromic flame retarder. The thickness and composition of the adhesive layer may be adjusted according to the tensile strength of the film base so that the tensile strength is higher than the adhesive force of the adhesive layer.

Polyester or PPS may be used as the film base.

Table 1 shows applied examples of the film base and the flame retarder as follows.

TABLE 1

| Base material | Flame retarder |
| --- | --- |
| Polycarbonate resin | Bromic flame retarder |
| Polyester resin | Nitrogen flame retarder |
| PPS resin | Phosphate flame retarder |
| PVC resin | Inorganic flame retarder |
| Fluororesin | |
| Polyimide resin | |
| Polyamide resin | |

In Table 1, the PPS resin, the PVC resin and the fluororesin exhibit flame retardancy in themselves. Any one of base material-flame retarder combinations shown in Table 1 may be used.

Table 2 shows applied examples of the base resin material and the flame retarder for forming the adhesive layer as follows.

TABLE 2

| | Adhesive layer (base resin material) | | | | |
| --- | --- | --- | --- | --- | --- |
| | Other curable type resin | Thermoplastic resin | Heat-curable resin | Pressure-sensitive adhesive agent | Flame retarder |
| Typical material | Silicone type (cured by humidity) | Polyethylene type | Epoxy type | Acrylic type | Bromic flame retarder |
| | | Polypropylene type | Phenol type | Natural rubber type | Nitrogen flame retarder |
| | | Polyester type | Unsaturated polyester type | Synthetic rubber type | Phosphate flame retarder |
| | | Acrylic type | | Synthetic resin type | Inorganic flame retarder |
| | | PVC type | Silicone type | Silicone type | Antimony compound |

Any one of resin material-flame retarder combinations shown in Table 2 may be used.

Although the embodiment has been described on the case where a thermoplastic resin added with a flame retarder is used as the adhesive layer, the invention may be also applied to the case where this resin is replaced by a heat-curable resin such as an epoxy resin added with a flame retarder or a pressure-sensitive adhesive resin added with a flame retarder.

SECOND EMBODIMENT

Figure 6A:
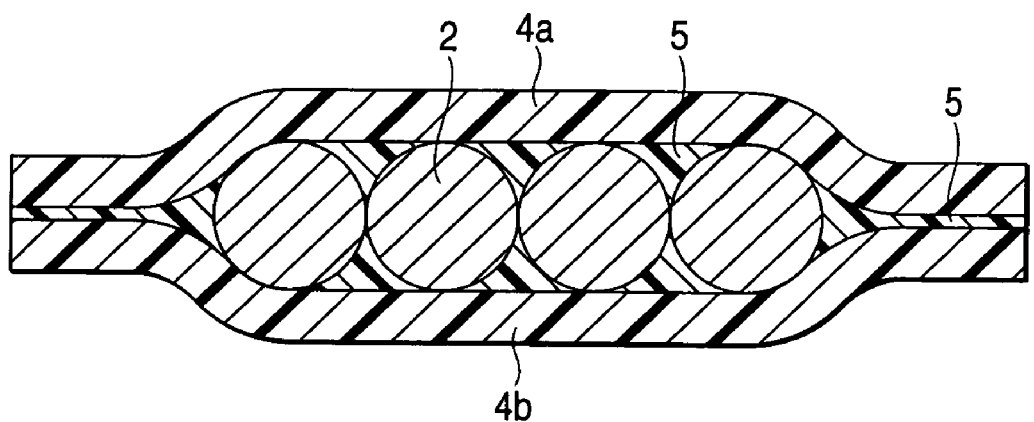
FIGS. 6A and 6B are sectional views showing a ribbon-like optical fiber core assembly according to a second embodiment of the invention.

Although the first embodiment has been described on the case where the ribbon-like optical fiber core assembly is formed so that optical fiber cores 2 are sandwiched between two film bases 4a and 4b constituting tape layers, this embodiment is configured as shown in FIG. 6A. That is, two facing surfaces of the film bases 4a and 4b protruded from each end of arrangement of the optical fiber cores 2 arranged planarly at designated intervals are bonded to each other. A 25 μm-thick polyester film is used as each of the film bases 4a and 4b forming the tape layers. A thermoplastic adhesive agent made of a polyolefin resin having a thickness of about 30 μm and added with a bromic flame retarder is provided on each film base.

In this embodiment, the tensile strength of each tape layer must be higher than the sum of the adhesive force of each tape layer to the optical fibers and the adhesive force of the bonding portions of the tape layers to each other so that part of the tape layer is kept non-broken at the time of peeling. Therefore, the compositions and thicknesses of the film base and the adhesive layer are decided to satisfy this relation.

According to this configuration, coating removability can be kept good. When the ribbon-like optical fiber core assembly needs to be separated into single cores, the films can be peeled easily from the bonding ends without damage of the optical fibers if peeling is started from portions protruded from ends of the row of optical fiber cores.

Figure 6B:
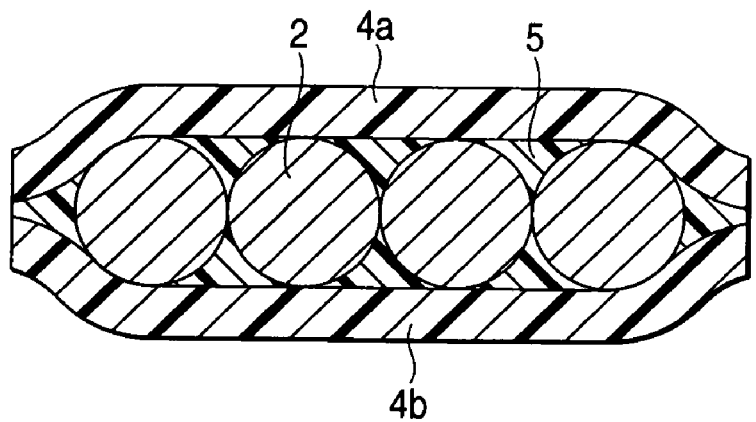

This embodiment may be modified as shown in FIG. 6B. That is, the film parallel portions may be removed from the end portions to shorten the end portions so that the ribbon-like optical fiber core assembly can be separated into single cores from the opposite end portions without breaking of the film bases. In this manner, space efficiency can be made high while single core separability is kept good.

According to this configuration, the film bases can be bonded to the cores by only a simple compression bonding step, so that excellent production efficiency can be obtained.

THIRD EMBODIMENT

Figure 7:
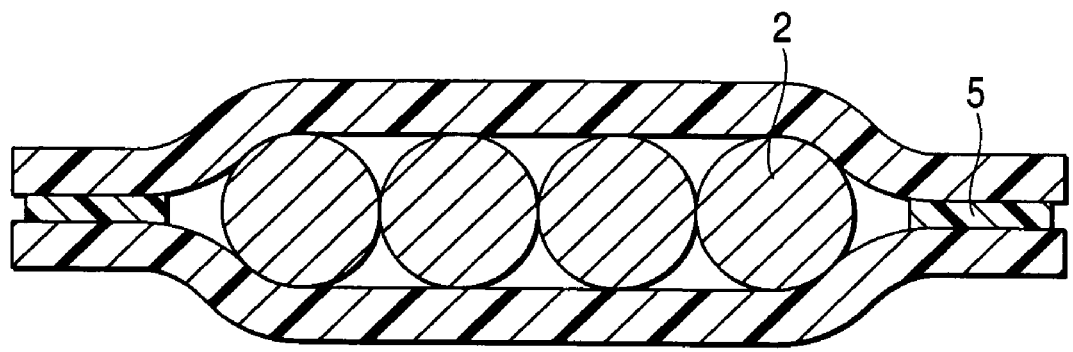
FIG. 7 is a sectional view showing a ribbon-like optical fiber core assembly according to a third embodiment of the invention.

Although the second embodiment has been described on the case where the ribbon-like optical fiber core assembly is formed so that optical fiber cores 2 arranged planarly are sandwiched between two film bases 4a and 4b and that two facing surfaces of the film bases 4a and 4b protruded from each of ends of the row of optical fiber cores 2 are bonded to each other, this embodiment is configured as shown in FIG. 7. That is, two facing surfaces of the film bases 4a and 4b protruded from each of ends of the row of optical fiber cores 2 arranged planarly are bonded to each other. Furthermore, only the outside viewed from the outer ends of the film bases is used as the region of application of the adhesive agent so that the optical fiber cores 2 are not in contact with the adhesive layer. That is, the optical fiber cores 2 are fixed while kept non-bonded. The material of each film base 4a, 4b may have low tensile strength compared with the first or second embodiment.

According to this configuration, because the adhesive layer is provided so as not to be in direct contact with the optical fiber cores arranged planarly at designated intervals, the ribbon-like optical fiber core assembly can be separated into single cores extremely easily.

Also in this embodiment, notches may be formed at bonding ends between the tape layers so that the tape layers can be peeled from the notches.

In this manner, from bonding ends, the ribbon-like optical fiber core assembly can be easily separated into single cores.

This embodiment may be modified so that the length of protrusion to each side of the film bases 4a and 4b forming the tape layer is reduced. In the modified example, reduction in size of the ribbon-like optical fiber core assembly as a whole can be attained. In this manner, space efficiency can be made high while single core separability is kept good.

FOURTH EMBODIMENT

Although the first to third embodiments have been described on the case where the optical fiber cores 2 arranged planarly at designated intervals are covered with films so as to be surrounded by the films, this embodiment is configured as shown in FIG. 8. That is, only one surface of the row of optical fiber cores 2 arranged planarly at designated intervals is fixed by a film base 4 provided with an adhesive layer 5. The material of the film base forming the tape layer and the adhesive layer 5 are the same as those in any one of the first, second and third embodiments.

A method for separating the ribbon-like optical fiber core assembly into single cores will be described below.

First, as shown in FIG. 9A, the ribbon-like optical fiber core assembly is prepared.

Then, as shown in FIG. 9B, the ribbon-like optical fiber core assembly is bent locally with a radius smaller than the smallest bending radius of each optical fiber from the first surface side of the row of optical fiber cores so that the film base 4 is kept non-broken while the optical fiber cores are broken. In this manner, the optical fiber cores 2 are broken at a position A.

Then, as shown in FIG. 9C, while the optical fiber cores 2s and the film base 4s on the front end side viewed from the breaking surface of the optical fiber cores are grasped, pulling force is applied thereon in the direction of detachment from the optical fiber cores to peel the side kept non-broken. In this manner, the film base 4 is peeled inward from the breaking position to a predetermined position.

In this manner, the ribbon-like optical fiber core assembly can be separated into single cores extremely easily. It is very easy to separate the ribbon-like optical fiber core assembly into single cores because the film is formed on only one surface of the row of optical fiber cores.

When the ribbon-like optical fiber core assembly needs to be separated into single cores, the tape layer can be peeled easily from its end portion without breaking of front ends of the optical fiber cores because one surface of the row of optical fiber cores is exposed.

FIFTH EMBODIMENT

Figure 11:
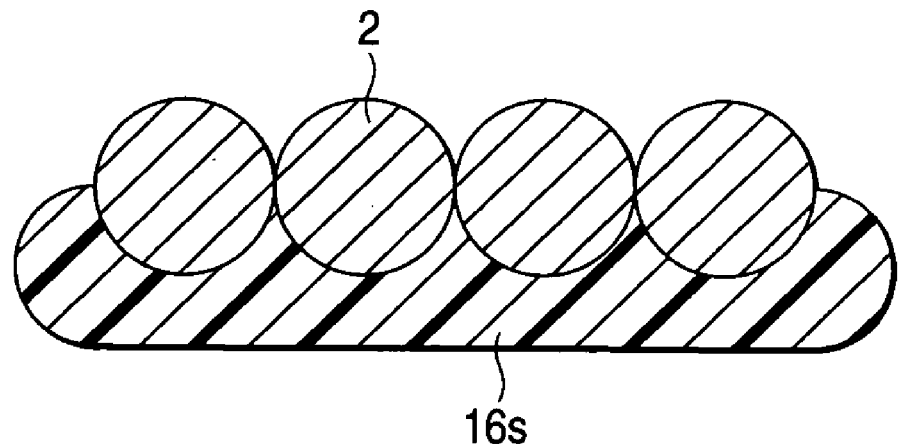
FIG. 11 is a sectional view showing a ribbon-like optical fiber core assembly according to a fifth embodiment of the invention.

As shown in FIG. 11, a heat-curable resin 16S may be molded on only one surface of the row of optical fiber cores 2.

Also in this case, the composition and thickness of the heat-curable resin are adjusted so that the tensile strength of the heat-curable resin is higher than the adhesive force of the heat-curable resin to the optical fiber cores.

According to this configuration, the ribbon-like optical fiber core assembly can be easily separated into single cores.

SIXTH EMBODIMENT

Figure 12A:
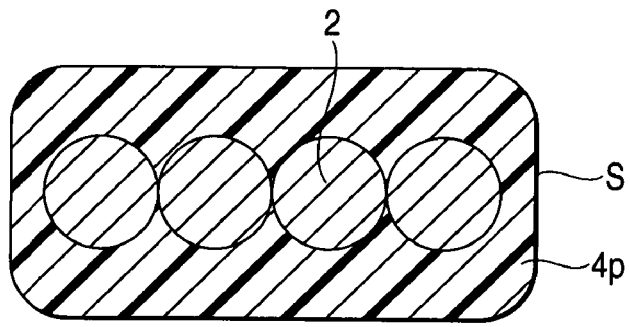
FIG. 12A is a sectional view showing a ribbon-like optical fiber core assembly according to a sixth embodiment of the invention.

As shown in FIG. 12A, this embodiment is configured so that thin portions S are formed on opposite sides to make it easy to peel the tape layer. Breaking grooves g may be further formed in side surfaces at designated intervals by mechanical processing so that the tape layer 4P can be divided into two from the opposite sides.

Also in this case, the optical fiber cores 2 arranged planarly are directly covered with the tape layer made of a flame retarding resin, so as to be surrounded by the tape layer.

In this embodiment, the material of the tape layer per se and the adhesive layer 5 are the same as those in the previous embodiment.

According to this configuration, when the ribbon-like optical fiber core assembly needs to be separated into single cores, the tape layer can be peeled easily from the breaking grooves.

Incidentally, modified examples of the bearing grooves are shown in FIGS. 12A to 12D.

Figure 12B:
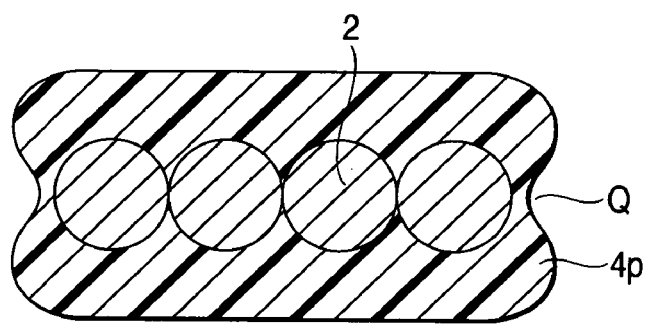
FIGS. 12B to 12D are sectional views showing modified examples of the ribbon-like optical fiber core assembly according to the sixth embodiment of the invention.
Figure 12C:
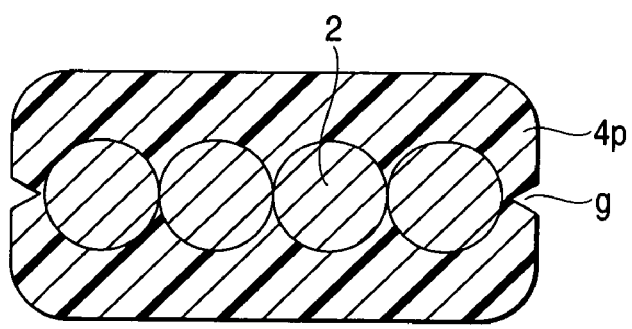
Figure 12D:
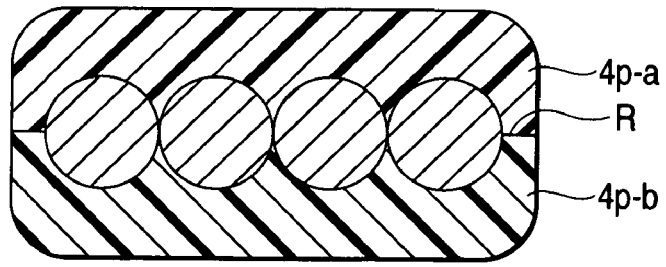
Figure 13A:
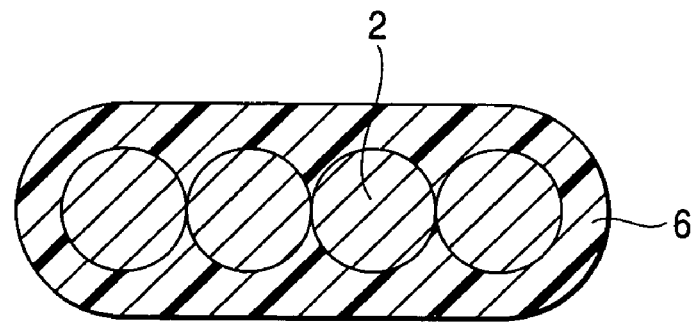
FIGS. 13A and 13B are sectional views showing highly flame-retardant tape cords according to the related art.
Figure 13B:
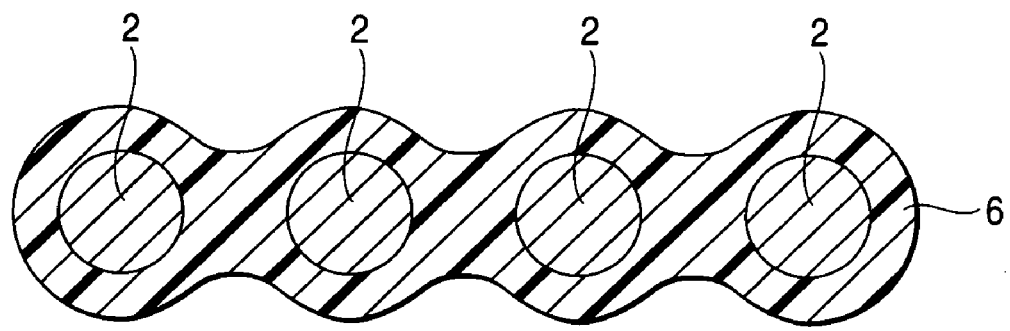

FIG. 12A shows the case where thin portions S are formed in sides of the tape layer 4P. FIG. 12B shows the case where cavities Q are formed in sides of the tape layer 4P. FIG. 12C shows the case where sectionally V-shaped breaking grooves g are formed in sides of the tape layer 4P. FIG. 12D shows the case where the resin 4p forming the tape layer is divided into two parts made of different kinds of resins 4p-a and 4p-b so that a bonding portion between the resins 4p-a and 4p-b is used as a separable boundary R from which the tape layer can be peeled. These resins 4p-a and 4p-b may be the same in kind but different in physical properties (e.g. ultraviolet-curable acrylic resin, and ultraviolet-curable urethane resin) or may be provided as two parts of quite the same resin cured with time difference. Any combination of resin materials or any method for forming the resins may be used if adhesive force is not generated for a surface of each resin once cured.

Figure 15:
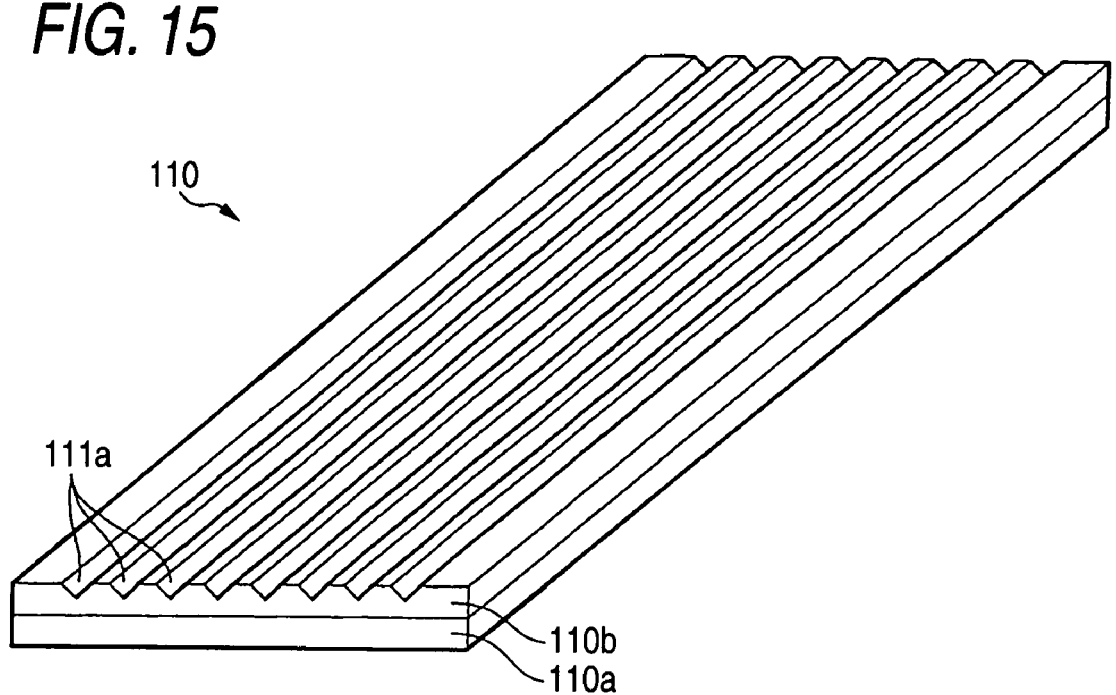
FIG. 15 is a perspective view showing a seventh embodiment of a film for tape core assembly according to the invention.
Figure 16A:
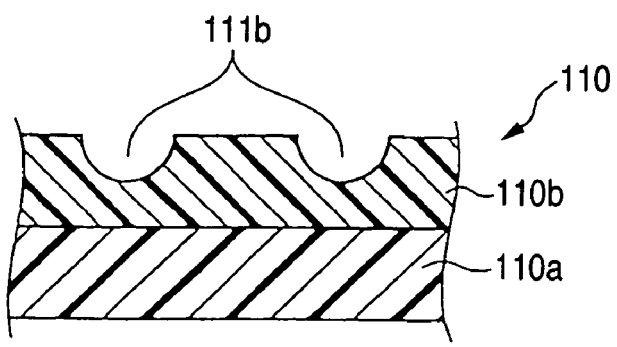
FIGS. 16A and 16B are sectional views showing examples of the shape of each groove other than the V shape.
Figure 16B:
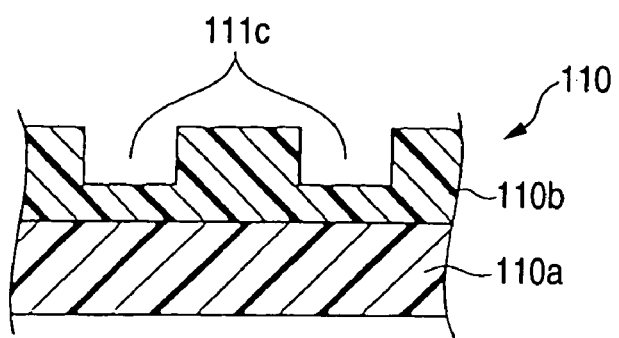
Figure 17A:
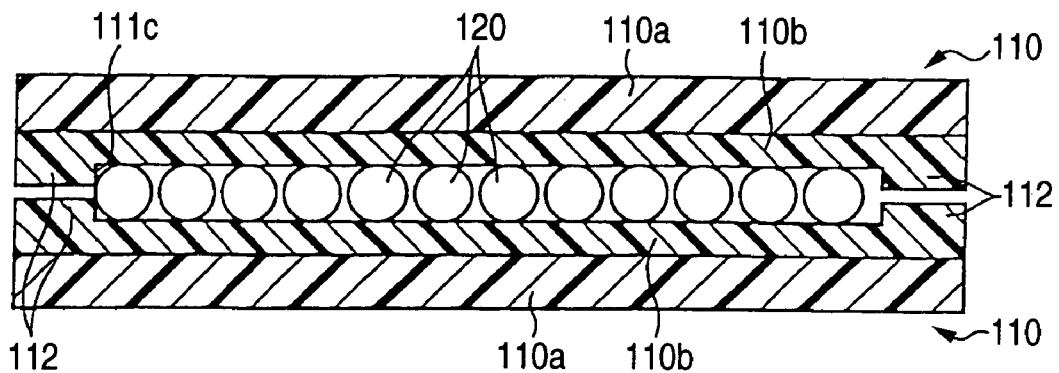
FIGS. 17A and 17B are sectional views showing examples of limitation of the positions of optical fibers by the position limiting portions of films.
Figure 17B:
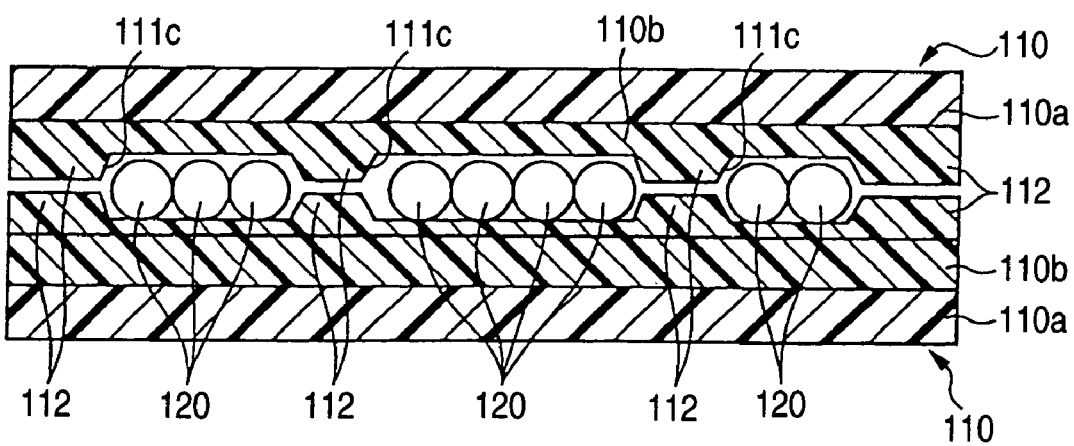
Figure 18A:
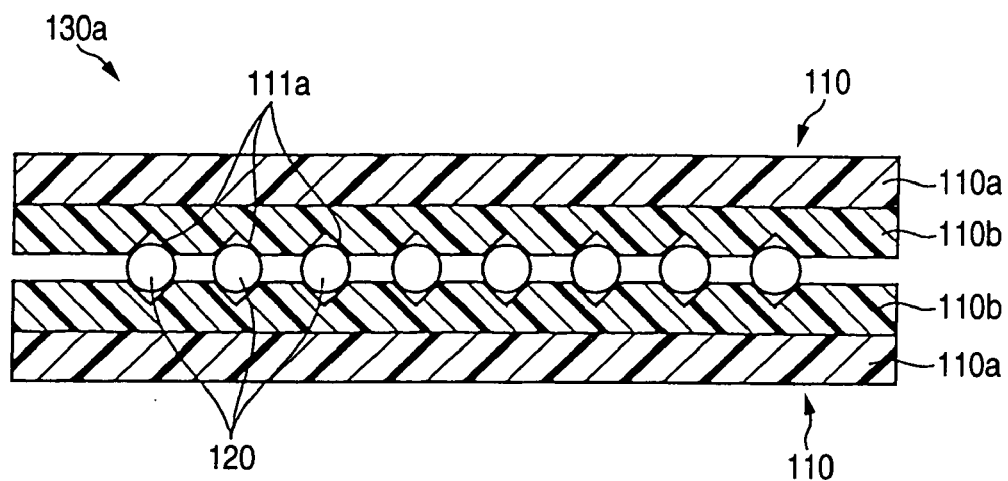
FIGS. 18A and 18B are sectional views of a tape core assembly integrated as a tape by use of a pair of such films.
Figure 18B:
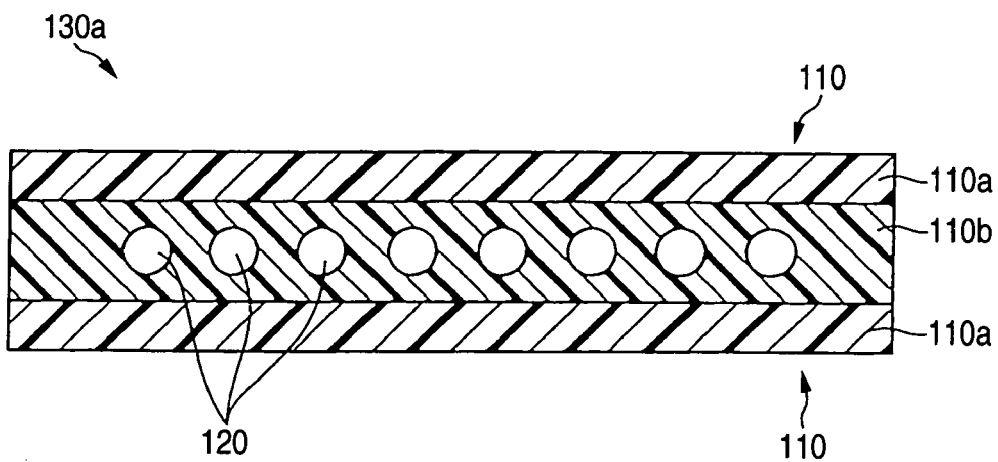

Further, embodiments of a film for tape core assembly, a tape core assembly and a method for integrating optical fibers as a tape according to the invention will be described below in detail with reference to the drawings. FIG. 15 is a perspective view showing a film for tape core assembly according to the invention. FIGS. 16A and 16B are sectional views showing examples of the shape of each groove. FIGS. 17A and 17B are sectional views showing examples of limitation of the positions of optical fibers by the position limiting portions of each film. FIGS. 18A and 18B are sectional views of a tape core assembly integrated as a tape by such films.

As shown in FIG. 15, a film 110 for tape core assembly (hereinafter referred to as "film" simply) according to the invention is formed as a multi-layer structure having a base layer 110a, and an adhesive layer 100b laminated on the base layer 110a. The film 110 is provided so that both flatness and stiffness are given to a tape core assembly integrated as a tape. For example, the base layer 110a may be made of a biaxially stretched polyester film. The adhesive layer 110b may be made of a high-melting adhesive agent such as a thermoplastic adhesive agent. Alternatively, a heat-curable adhesive agent, an ultraviolet-curable adhesive agent, or the like, may be used. Incidentally, another layer such as a flame retardant layer for making the tape core assembly flame-retardant may be further provided if necessary.

The flame retardant layer is not particularly limited if the layer has flame retardancy. A layer made of a resin composition containing a resin, and a flame retarder may be preferably exemplified as the flame retardant layer. Examples of the resin used in the flame retardant layer include copolymeric polyester and polyolefin. Examples of the flame retarder include a commercially available agent such as a bromic flame retarder or a chlorine flame retarder, and an inorganic flame retarder such as magnesium hydroxide. The amount of the flame retarder contained in the whole resin composition is preferably not smaller than 30% by weight, more preferably not smaller than 40% by weight. Accordingly, a high grade of flame retardancy can be given to the tape core assembly. The amount of the flame retarder contained in the whole resin composition is preferably not larger than 70% by weight. Accordingly, the mechanical strength of the flame retardant layer can be kept surely.

A plurality of V-grooves 111a, which form position limiting portions 111 capable of limiting the positions of a plurality of optical fibers, are formed on the surface side of the adhesive layer 110b of the film 110 so as to be arranged at intervals of a predetermined pitch. The size of each V-groove 111a corresponds to the diameter of an optical fiber. The size of each V-groove 111a is decided so that the optical fiber can be positioned and a corresponding optical fiber cannot move in the inside of the V-groove 111a when two films 110 are stuck to each other.

Incidentally, U-grooves 111b as shown in FIG. 16A or rectangular grooves 111c (including trapezoid grooves) as shown in FIG. 16B other than the V-grooves 111a may be used as the position limiting portions. In the case of U-grooves 111b, the radius of a semicircular portion at a front end of each U-groove 111b is preferably selected to be smaller than the radius of a corresponding optical fiber 120 to thereby prevent the optical fiber 120 from moving.

FIGS. 17A and 17B show modified examples of the rectangular grooves 111c. That is, as shown in FIG. 16B, rectangular grooves 111c equal in number to the optical fibers may be provided in accordance with the pitch of arrangement of the optical fibers. As shown in FIG. 17A, one rectangular groove 111c, however, may be provided so that all the optical fibers 120 can be collectively enclosed in the rectangular groove 111c. Or, as shown in FIG. 17B, rectangular grooves 111c may be provided so that a predetermined number of optical fibers 120 can be collectively enclosed in each rectangular groove 101c. Incidentally, from a different point of view, it can be conceived that FIG. 17A shows the case where protrusions 112 are provided at opposite ends whereas FIG. 17B shows the case where protrusions 112 are provided at intervals.

FIGS. 18A and 18B, FIGS. 19A and 19B and FIGS. 20A and 20B show examples of a section of a tape core assembly before and after integration into a tape by use of the film according to the invention.

In the tape core assembly 130a shown in FIG. 18A, films 110 having V-grooves 111a provided at intervals of a pitch equal to the pitch of arrangement of the optical fibers 120 are disposed on upper and lower sides so that the optical fibers 120 are sandwiched between the films 110. Accordingly, the optical fibers 120 are positioned by the upper and lower V-grooves 111a so that the movement of the optical fibers 120 is limited. When the two films 110 and 110 are bonded to each other while pressed against each other, a tape core assembly shaped like a tape is obtained as shown in FIG. 18B.

Figure 19A:
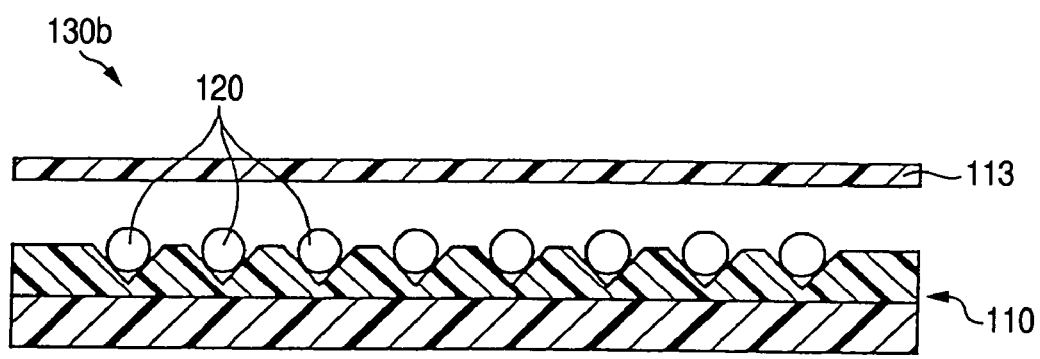
FIGS. 19A and 19B are sectional views of a tape core assembly integrated as a tape by use of such a film.
Figure 19B:
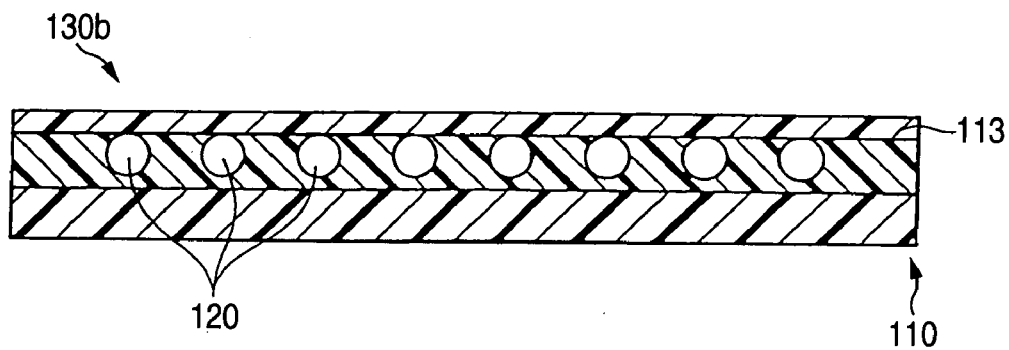

In the tape core assembly 130b shown in FIG. 19A, a film 110 according to the invention is disposed on the lower side whereas a film 113 is used on the upper side. Even in this case, the optical fibers 120 are positioned by the V-grooves 111a of the lower film 110 so that the movement of the optical fibers 120 is limited. When the two films 110 and 113 are bonded to each other, a tape core assembly is obtained as shown in FIG. 19B.

Figure 20A:
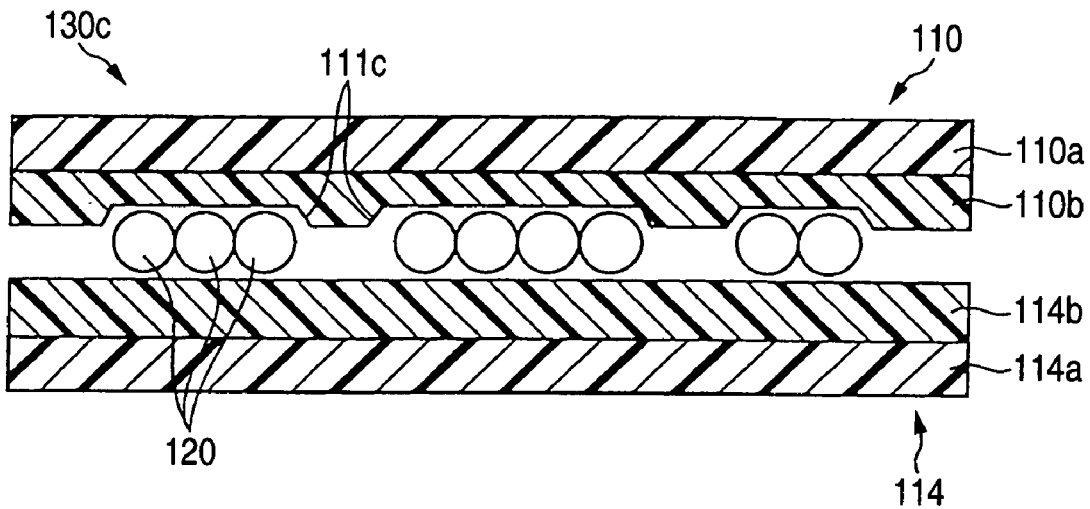
FIGS. 20A and 20B are sectional views of a tape core assembly integrated as a tape by use of such a film.
Figure 20B:
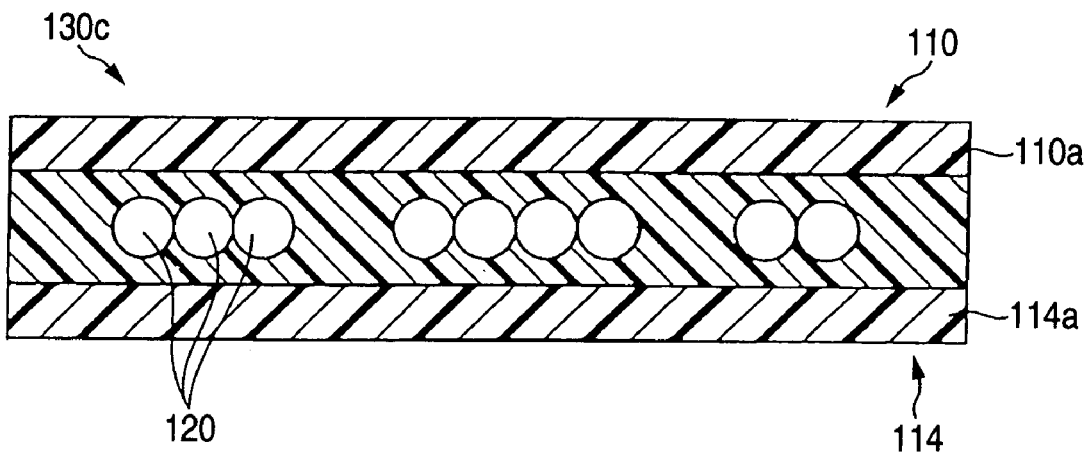

In the tape core assembly 130c shown in FIG. 20A, a film 110 having rectangular grooves 111c is disposed on the upper side whereas a film 114 having a base layer 114a and an adhesive layer 114b and heretofore used is disposed on the lower side. When the two films 110 and 114 are bonded to each other, a tape core assembly is obtained as shown in FIG. 20B.

As described above, films according to the invention may be disposed on opposite upper and lower surfaces of an optical fiber row for tape formation or a film according to the invention may be disposed on one of the upper and lower sides while a film heretofore used is disposed on the other side. As the film heretofore used, there may be used a film having no adhesive layer or a film having a base layer and an adhesive layer.

Figure 21:
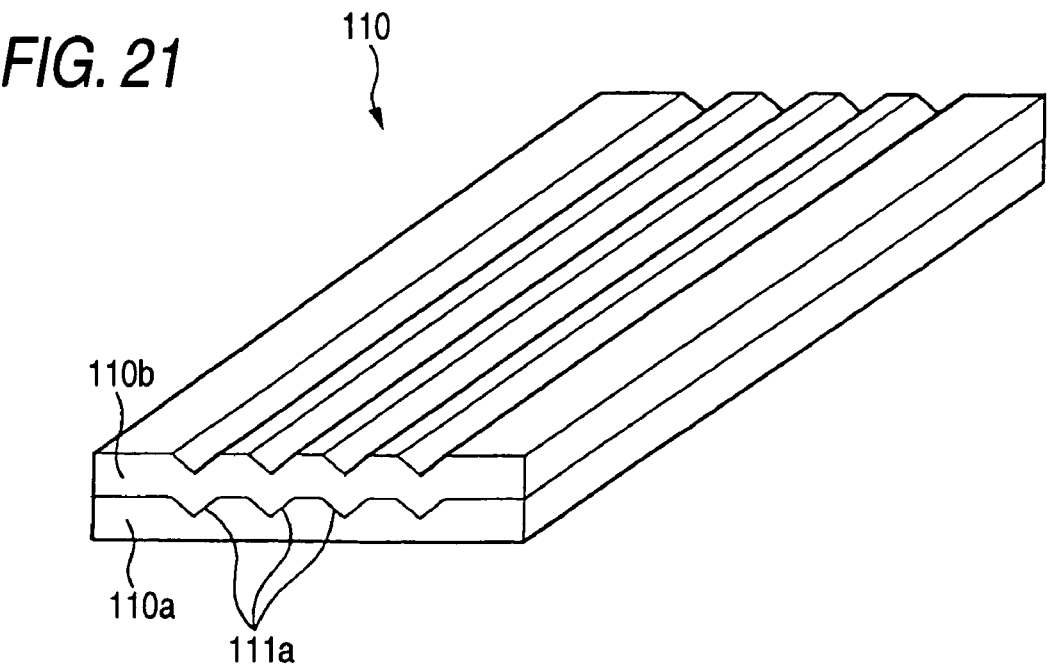
FIG. 21 is a perspective view showing a film for tape core assembly according to another embodiment of the invention.

The film 110 has been described on the case where position limiting portions of various shapes are provided on the surface side of the adhesive layer 110b provided on the flat base layer 110a. As shown in FIG. 21, position limiting portions 111 of various shapes (V-grooves 111a in FIG. 21) may be further provided in the base layer 110a. In this case, the thickness of the adhesive layer 110b is preferably made uniform so that the shape of the position limiting portions can appear on the surface side of the adhesive layer 110b. Although FIG. 21 shows the case where V-grooves 111a are provided, it is a matter of course that position limiting portions of another shape may be provided.

Figure 22A:
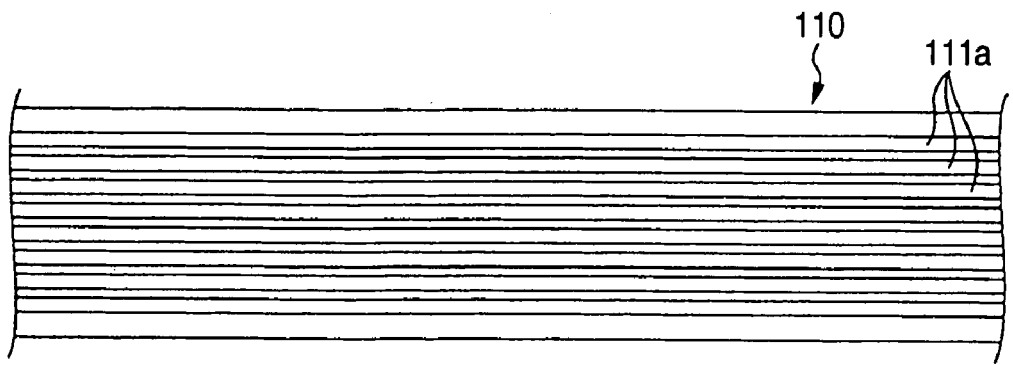
FIG. 22A is a plan view of a film in which position limiting portions are provided at intervals of a predetermined pitch in the lengthwise direction.
Figure 22B:
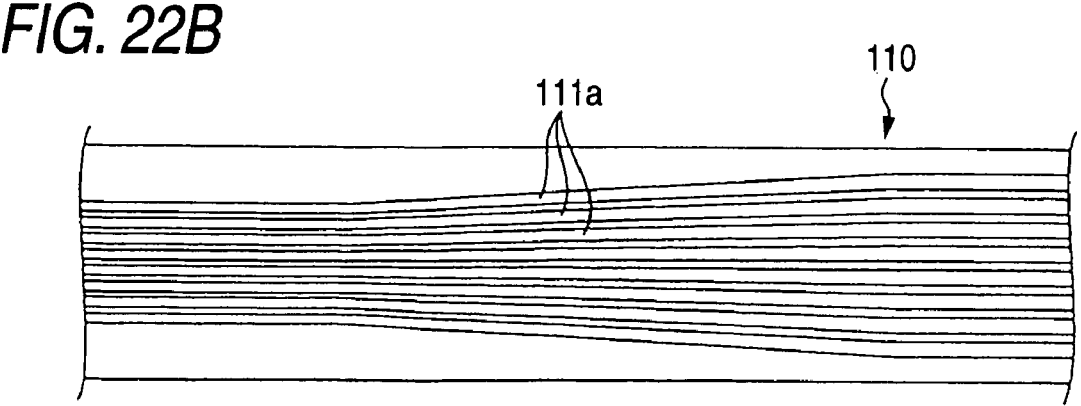
FIG. 22B is a plan view of a film in which position limiting portions are provided at intervals of a pitch varying in the lengthwise direction.
Figure 23:
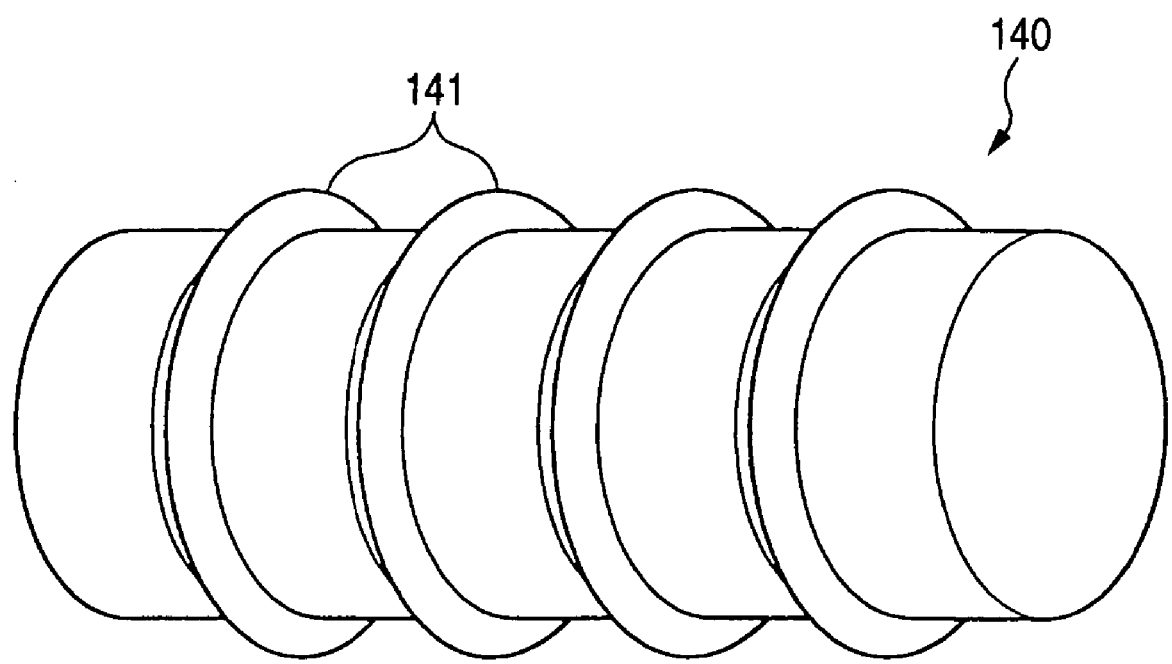
FIG. 23 is a perspective view of a groove-forming roller for forming position limiting portions at intervals of a predetermined pitch in the lengthwise direction.

The film 110 has been described on the case where various kinds of grooves 111a to 111c as the position limiting portions and protrusions 112 are provided in parallel at intervals of a predetermined pitch in the lengthwise direction as shown in FIG. 22A. In this case, a groove-forming roller 140 having predetermined-shape (e.g., V-shape) blades 141 provided at intervals of a predetermined pitch as shown in FIG. 23 can be used for transferring V-grooves 111a or the like onto a surface of the adhesive layer 110b in the lengthwise direction of the film 110. Incidentally, the film 110 may be formed so that the groove pitch a tone end portion of the film 110 is different from the groove pitch at the other end portion of the film 110 as shown in FIG. 22B. In this case, the roller 140 need not be used.

When a flame retardant material is used in the base layer 110a or the adhesive layer 110b of the film 110 or when the aforementioned flame retardant layer is provided in addition to the base layer 110a and the adhesive layer 110b, the film 110 can be made flame-retardant. For example, the base layer 110a having flame retardancy may be made of a polyester resin added with a bromic flame retarder. The polyester resin contains a predetermined amount of bromine. More specifically, a bromic flame retarder is added to the polyester resin. The amount of bromine is decided on the basis of the weight of the polyester resin composition. For example, the flame retardant adhesive layer 10b may contain antimony.

More specifically, for example, antimony trioxide may be used. Antimony trioxide is a flame-retarding assistant. Although it is almost impossible to obtain any flame-retarding effect when only antimony trioxide is added to a resin, a higher grade of flame retardancy can be attained when antimony trioxide is used in combination with a bromic flame retarder as represented by the polyolefin resin composition. The polyolefin resin composition fulfills a function of stopping a thermal decomposition chain reaction, a function of blocking oxygen and a function of accelerating carbonization on the basis of the synergistic effect of antimony trioxide and a bromic compound. Such a film 110 can be used effectively in a place flammable due to generation of heat.

Table 1 shows applied examples of the base material and the flame retarder for forming the base layer 110a as follows.

Table 3 shows applied examples of the resin material and the flame retarder for forming the adhesive layer 110b.

TABLE 3

| | Resin material | | | | |
|---|---|---|---|---|---|
| | Thermo-plastic resin | Heat-curable resin | Pressure-sensitive adhesive agent | Other curable type resin | Flame retarder |
| Typical material | Poly-ethylene type | Epoxy type | Acrylic type | Silicone type (cured by humidity) | Bromic flame retarder |
| | Poly-propylene type | Phenol type | Natural rubber type | | Nitrogen flame retarder |

TABLE 3-continued

| Resin material | | | | |
|---|---|---|---|---|
| Thermo-plastic resin | Heat-curable resin | Pressure-sensitive adhesive agent | Other curable type resin | Flame retarder |
| Polyester type | Unsaturated polyester type | Synthetic rubber type | | Phosphate flame retarder |
| Acrylic type | | Synthetic resin type | | Inorganic flame retarder |
| PVC type | Silicone type | Silicone type | | Antimony compound |

Any one of resin material-flame retarder combinations shown in Table 3 may be used.

SEVENTH EMBODIMENT

A specific embodiment of the invention will be described below. A film 110 used has a base layer 110a of PET 25 μm thick, and an adhesive layer 110b of a polyester thermoplastic adhesive agent 50 μm thick. When a plurality of optical fibers 120 need to be disposed so as to be adjacent to one another, V-grooves 111a are transfer-molded on the surface side of the adhesive layer 110b by a laminated roll 140 as shown in FIG. 23 so as to be arranged at intervals of a pitch of 0.255 mm in the lengthwise direction to thereby form position limiting portions. Incidentally, when a predetermined number of optical fibers 120 need to be collected in each groove, rectangular grooves 111c each having a predetermined length may be preferably provided as shown in FIGS. 17A and 17B.

A method for integrating optical fibers as a tape according to the invention will be described below. FIG. 24A is a front view of tape-forming apparatus for carrying out the method for integrating optical fibers as a tape according to the invention, and FIG. 24B is a plan view of the tape-forming apparatus.

In the tape-forming apparatus 150, a pair of upper and lower films 110 and 110 are paid out from the upstream side (left in FIGS. 24A and 24B) so that optical fibers 120 are sandwiched between the films 110 and 110. Various kinds of grooves 111 as position limiting portions have been not formed in each film 110 yet. That is, each film 110 paid out has a flat base layer 110a, and a flat adhesive layer 110b. The films 110 and 110 are supplied to groove-forming rollers 140 and 140 for forming grooves 111 as position limiting portions. In this manner, each film 110 according to the invention is formed as described above. Blades 141 of the shape corresponding to the shape of grooves are provided in each groove-forming roller 140 so as to be arranged at designated intervals. The groove-forming rollers 140 and 140 are provided with rollers 151 and 151 for pressing the films 110 and 110 against the groove-forming rollers 140 and 140 respectively so that the rollers 151 and 151 can rotate. Incidentally, the films 110 may be paid out after grooves 111 are formed in each film 110 in advance. In this case, the groove-forming rollers 140 and 140 need not be used.

Figure 25:
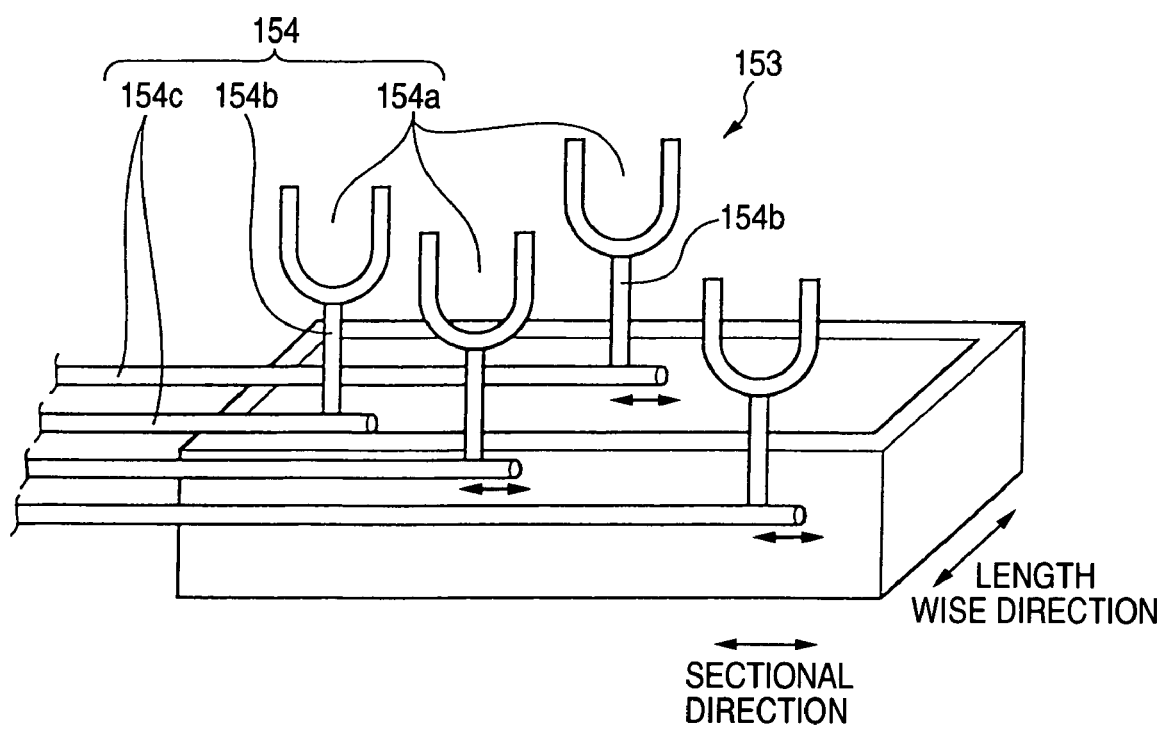
FIG. 25 is a perspective view of a positioning mechanism for aligning optical fibers in required positions.
Figure 26A:
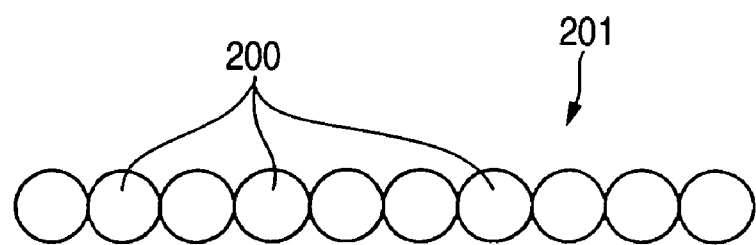
FIGS. 26A to 26C are procedural views showing a method for integrating optical fibers as a tape according to the related art.
Figure 26B:
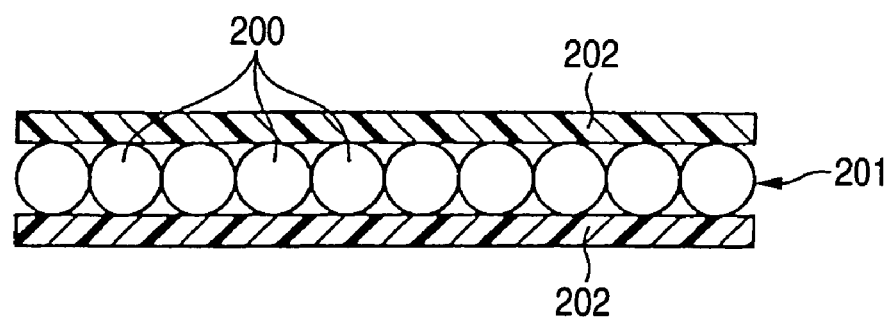
Figure 26C:
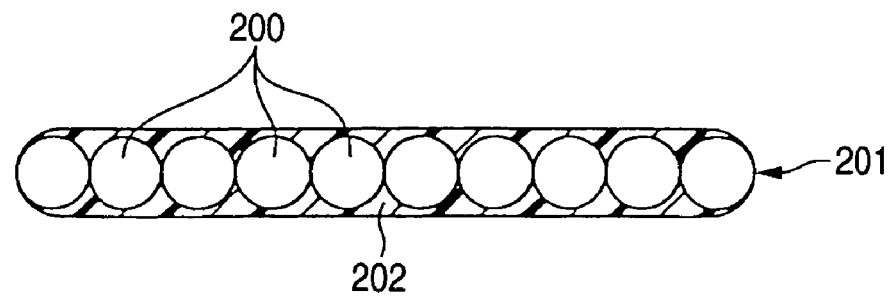
Figure 27:
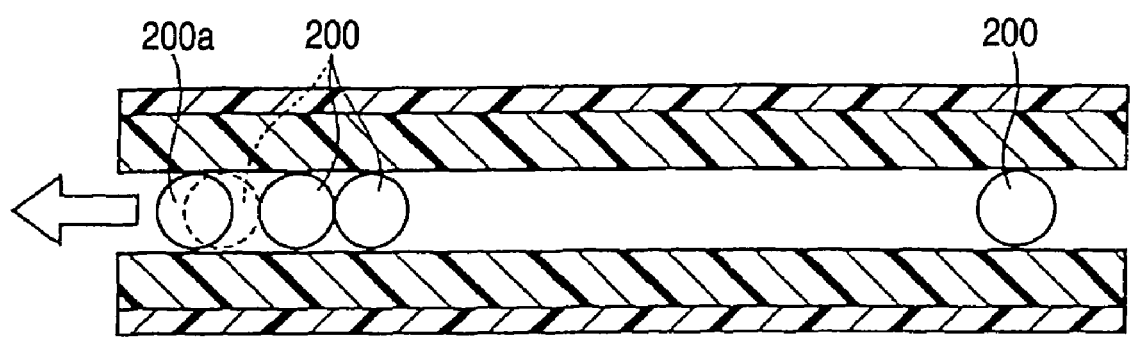
FIG. 27 is a sectional view showing a problem in the method for integrating optical fibers as a tape according to the related art.

Feed rollers 152 of the number corresponding to the number of optical fibers 120 are provided on the downstream side of the groove-forming rollers 140 and 140 so that the feed rollers 152 supply the optical fibers 120 into the grooves 111 formed by the groove-forming rollers 140 and 140. The optical fibers 120 are positioned by the feed rollers 152 respectively. A positioning mechanism 153 for positioning the optical fibers 120 accurately is provided on the downstream side of the supply rollers 152. For example, as shown in FIG. 25, the positioning mechanism 153 has a predetermined number of support members 154 for supporting and positioning the optical fibers 120. U-shaped support portions 154a for supporting the optical fibers 120 are provided as upper portions of the support members 154. Pillars 154b for supporting the support portions 154a are attached to movable members 154c respectively. The movable members 154c are provided so that the movable members 154c can be moved/positioned in the sectional direction (left-right direction in FIG. 25). The optical fibers 120 are positioned accurately by the movement of the movable members 154c.

A pair of heating rollers 155 and 155 are provided on the downstream side of the positioning mechanism 153 so that the two films 110 and 110 are pressed while heated so as to be bonded to each other.

An operation of the tape-forming method will be described below with reference to FIGS. 24A and 24B. First, two films 110 and 110 are supplied to the groove-forming rollers 140 and 140 respectively to form grooves 11 as position limiting portions. While the two films 110 and 110 having the position limiting portions formed therein are fed, a plurality of optical fibers 120 are fed in between the two films 110 and 110. The optical fibers 120 are positioned by the positioning mechanism 153 so as to be fitted into the predetermined grooves 111 respectively. While the optical fibers 120 positioned into the grooves 111 are sandwiched between the two films 110 and 110, the films 110 and 110 are pressed while heated by the pair of heating rollers 155 so as to be bonded to each other.

According to the film for tape core assembly and the method for integrating optical fibers as a tape, the two films 110 and 110 are bonded to each other while the optical fibers 120 are sandwiched between the two upper and lower films 110 and 110 in the condition that the optical fibers 120 are positioned into the position limiting portions such as grooves 111 provided in each film 110, that is, in the condition that the optical fibers 120 cannot move. Accordingly, the optical fibers 120 can be integrated as a tape while held at intervals of a predetermined pitch.

Films having grooves or protrusions formed by a separate process in advance may be prepared. In this case, a tape core assembly having optical fibers held at intervals of a predetermined pitch can be produced by a simple operation of arranging the optical fibers along the grooves or protrusions without use of any large-scale and complex fiber alignment apparatus. When, for example, optical fibers each having a length of from the order of cm to the order of m need to be integrated as a tape by a simple operation, a tape core assembly having optical fibers arranged at intervals of a required pitch can be partially produced by only a manual operation according to circumstances without use of any special fiber alignment jig. This is very effective in binding a plurality of short optical fibers as a tape in the inside of an optical module or the like.

Incidentally, the film for tape core assembly and the method for integrating optical fibers as a tape according to the invention are not limited to the aforementioned embodiment and various suitable changes, modifications, etc. may be made.

Although an example of the tape-forming apparatus 150 has been described on the case where V-grooves 111a as position limiting portions are provided in the upper and lower films 110 and 110 between which the optical fibers 120 are sandwiched, the invention may be also applied to the case where V-grooves 111a are provided in either of the upper and lower films 110 and 110.

Although the tape-forming apparatus 150 has been described on the case where the optical fibers 120 are integrated as a tape while arranged at intervals of a predetermined pitch in the lengthwise direction, the invention may be also applied to the case where the optical fibers 120 are arranged so that the pitch at one end portion of the films 110 is different from the pitch at the other end portion of the film 110 in the lengthwise direction. In this case, films 110 having grooves 111 formed at intervals of a designated pitch in advance without use of the groove-forming rollers 140 are prepared. The optical fibers 120 are arranged into the groves 111 so that the optical fibers 120 can go into the grooves 111 while the positions of the optical fibers 120 are changed by the positioning mechanism 153.

Further, a ribbon-like optical fiber core assembly according to the invention will be described below in detail with reference to the drawings.

EIGHTH EMBODIMENT

Figure 28:
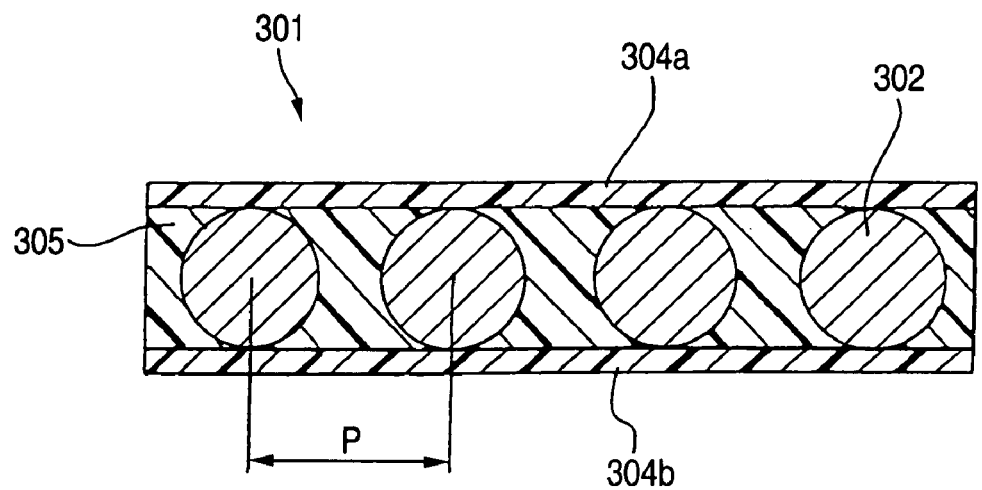
FIG. 28 is a sectional view showing a ribbon-like optical fiber core assembly according to an eighteenth embodiment of the invention.

FIG. 28 is a sectional view showing a ribbon-like optical fiber core assembly according to the invention.

As shown partially and roughly in FIG. 28, the highly flame-retardant ribbon-like optical fiber core assembly 301 according to this embodiment includes: 16 optical fiber cores 302 (in which only 4 cores are shown in FIG. 28) each having a glass fiber diameter of 80 μmΦ and a core coating diameter R of 165 μmΦ are arranged planarly at intervals of a pitch P of 180 μm; an adhesive layer 305 made of a polyolefin resin added with a bromic flame retarder as a flame retarder and disposed on the outer circumferences of the optical fiber cores 302 so that the adhesive layer 305 enters gaps between adjacent ones of the optical fiber cores 302; and film bases made of polyester films 304a and 304b and disposed so that the outer circumference of the ribbon-like arrangement of the optical fiber cores 302 is sandwiched between the polyester films 304a and 304b while the outer circumferences of the optical fiber cores 302 are surrounded by the adhesive layer 305. Incidentally, the bromic flame retarder may be also added to the polyester films. In this embodiment, the thickness of each of the film bases is selected to be 25 μm whereas the thickness of the adhesive layer is selected to be 30 μm.

Figure 29A:
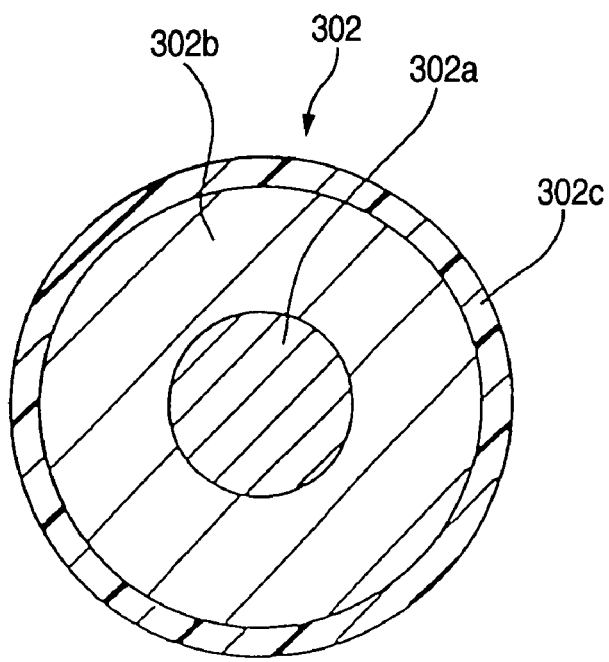
FIGS. 29A and 29B are enlarged views showing main portions of examples of an optical fiber core.
Figure 29B:
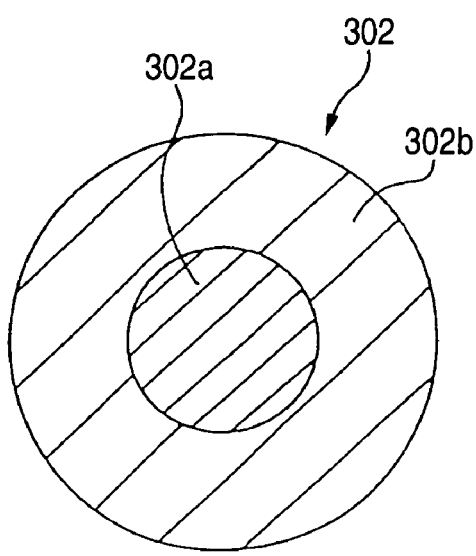

The ribbon-like optical fiber core assembly 301 is formed in such a manner that the circumference of the arrangement of the 16 optical fiber cores 302 arranged in parallel in a horizontal row with gaps between adjacent ones of the optical fiber cores 302 is compression-bonded to the polyester films 304a and 304b through the adhesive layer 305. As shown in FIG. 29A which is an enlarged view, a quartz single mode optical fiber core or a quartz multi-mode optical fiber core including a glass fiber 302a made of a core and a clad, and a coating 302b with which the circumference of the glass fiber 302a is covered is used as each optical fiber core 302. The reference numeral 302c designates a colored layer. Although this embodiment shows the case where quartz multi-mode optical fiber cores are used, the invention is not limited thereto. For example, the invention may be also applied to polymer clad optical fibers and plastic optical fibers. As shown in FIG. 29B, the colored layer 302c may be dispensed with. That is, optical fiber cores each having the glass fiber 302a and the coating 302b without the colored layer 302c may be mixed with optical fibers each further having the colored layer 302c. In this case, the optical fiber cores may be disposed asymmetrically so that the sequence of arrangement of the optical fiber cores can be specified.

A method for producing the ribbon-like optical fiber core assembly according to this embodiment will be described below.

Figure 30A:
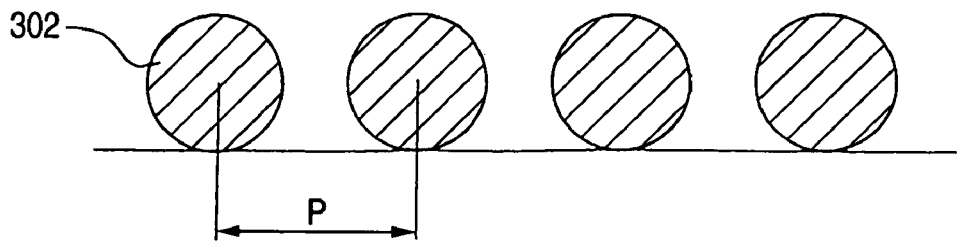
FIGS. 30A to 30C are procedural views showing a process for producing the ribbon-like optical fiber core assembly.

First, as shown in FIG. 30A, 16 optical fiber cores 302 (in which only 4 cores are shown in FIG. 30A) are arranged planarly at intervals of a pitch P of 180 μm so that gaps are formed between adjacent ones of the optical fiber cores 302 respectively.

Figure 30B:
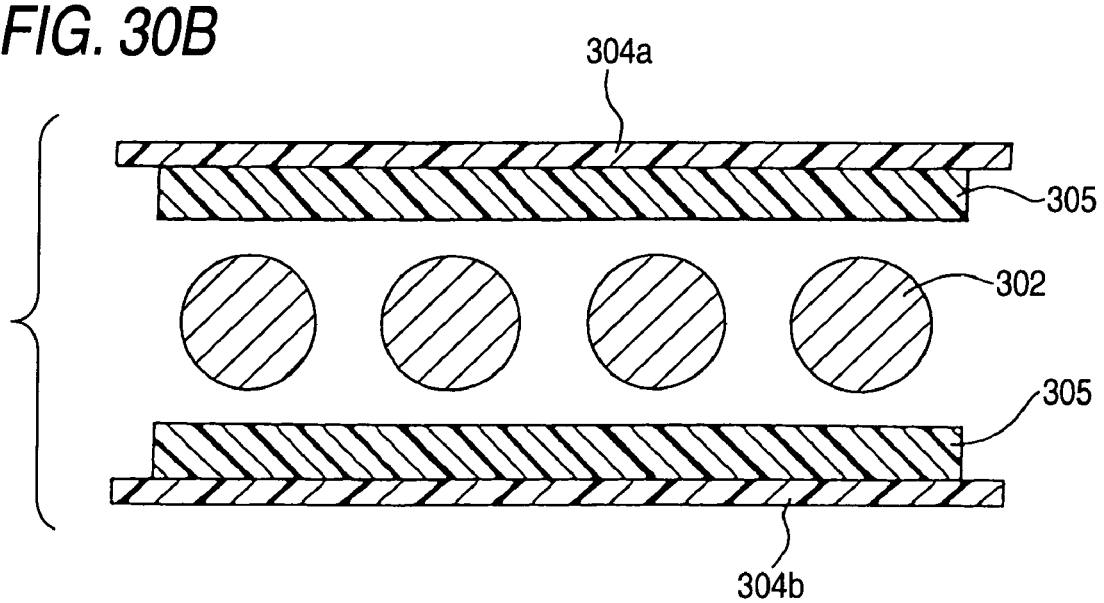
Figure 30C:
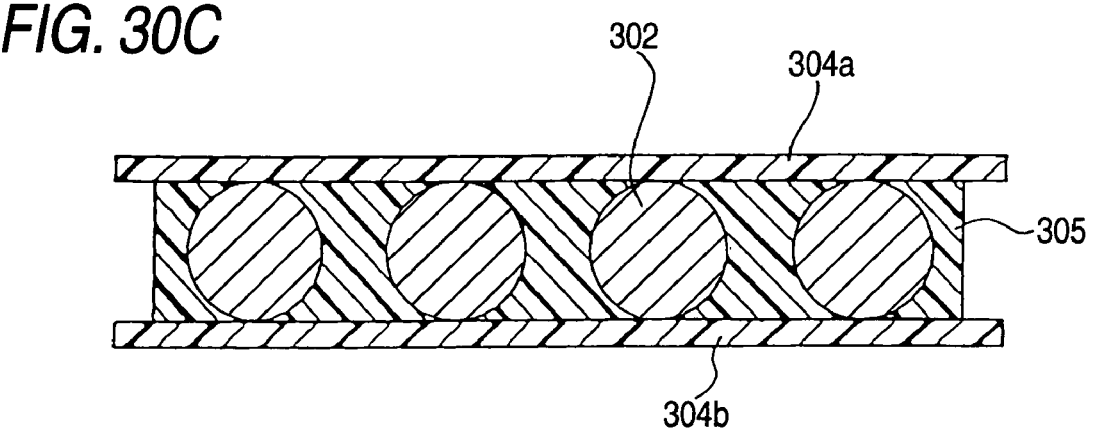

Then, as shown in FIG. 30B, a thermoplastic adhesive layer 305 made of a polyolefin resin having a thickness of about 30 μm and added with a bromic flame retarder is applied on a surface of each film base 304a, 304b made of a polyester resin with a thickness of 25 μm. The plurality of optical fiber cores 302 arranged in the aforementioned manner are sandwiched between the film bases 304a and 304b and thermo-compression-bonded to the film bases 304a and 304b by the thermoplastic adhesive layer 305 as shown in FIG. 30C.

Figure 31:
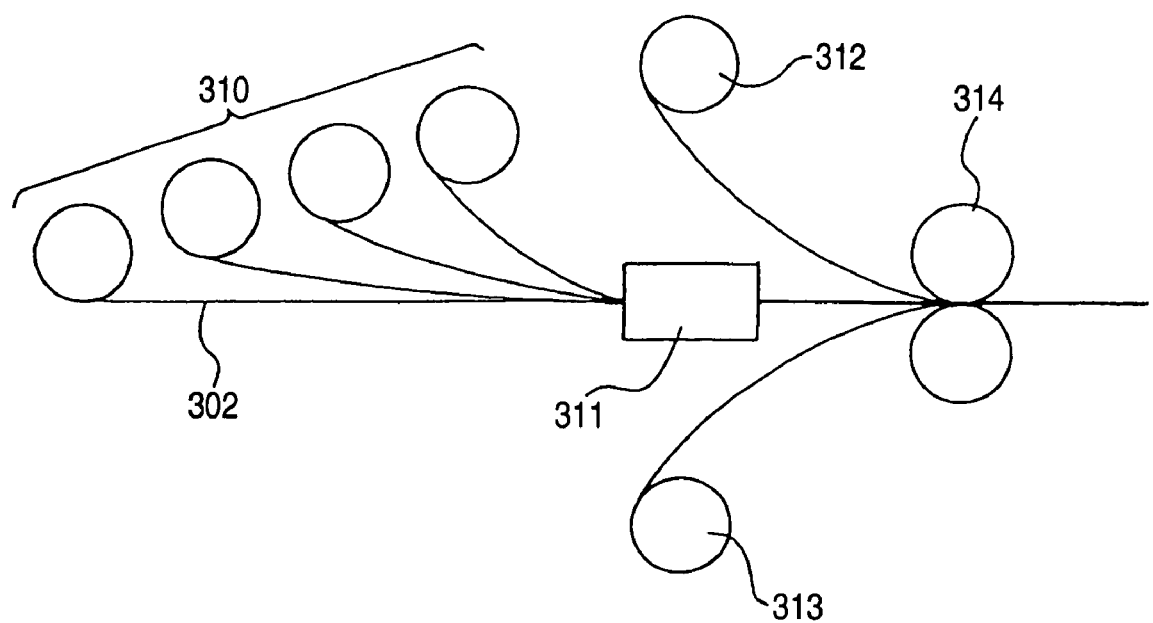
FIG. 31 is a sectional view showing apparatus for producing the ribbon-like optical fiber core assembly.

FIG. 31 is a typical view showing apparatus for producing the ribbon-like optical fiber core assembly. In the apparatus, four optical fiber cores 302 are paid out from reels 310 respectively while drawn up successively. The four optical fiber cores 302 are aligned planarly in a row by an alignment portion 311 so that the pitch of arrangement of the optical fiber cores 302 is adjusted. Adhesive layer 5—containing film bases 304a and 304b are paid out from tape reels 312 and 313 respectively. The film bases 304a and 304b are heated by a heating portion 314. Then, the film bases 304a and 304b are cooled and cured. A slit-forming portion may be provided on the downstream side of the heating portion 314 so that windows (slits) arranged at designated intervals can be formed in the film bases. In this case, the ribbon-like optical fiber core assembly can be separated into single cores more easily.

In this manner, the adhesive layer enters gaps between the optical fiber cores or between the optical fiber cores and the film bases well, so that adhesive characteristic can be improved. The ratio of the size of each gap between adjacent optical fiber cores to the diameter of one optical fiber core is about 9.1%.

The thickness of the thinnest portion of the adhesive layer at the interface where an optical fiber core and a film base are compression-bonded to each other is 15 μm, that is, 9.1% of the diameter of an optical fiber core.

Incidentally, the ribbon-like optical fiber core assembly has a uniform width on the whole length, so that the batch coating can be removed easily by a batch coating remover. In addition, because the gaps between the optical fiber cores are filled with the adhesive layer, the adhesive layer adheres to the coatings of the optical fiber cores well. Accordingly, the glass fibers can be taken out easily.

In the bonding step, after the adhesive agent is not cured by light but softened by heat, the adhesive agent is cured in the condition that the plurality of optical fiber cores are sandwiched between the flame retardant films. Accordingly, even in the case where a flame retarder is added to the adhesive agent, the adhesive agent can be cured well because the flame retarder does not disturb the curing of the adhesive resin. As a result, a ribbon-like optical fiber core assembly strong and high in reliability can be formed. In addition, the ribbon-like optical fiber core assembly has a thickness of 245 μm to be not large compared with the related art and is good in external appearance. Incidentally, the thickness can be reduced to about 215 μm according to the state of compression.

The shrinkage ratio of each film used in this embodiment after softening is in a range of from 0.06% to 1.02%. Accordingly, increase in transmission loss can be prevented from being caused by shrinkage distortion imposed on the glass fibers.

According to this structure, the film bases can be bonded to the cores by a simple compression bonding step. Accordingly, excellent production efficiency can be obtained.

Each polyester resin film 304a, 304b added with a bromic flame retarder, which is used as the film base for forming the skin of the tape-optical fiber core assembly 301 according to the invention, contains a predetermined amount of bromine. More specifically, the polyester resin added with a bromic flame retarder is prepared in such a manner that a flame retarder containing bromine is added to a polyester resin.

The bromine content is selected by reference to the weight of the polyester resin composition.

Table 3 shows applied examples of the resin material and the flame retarder for forming the adhesive layer as follows.

Although the embodiment has been described on the case where a thermoplastic resin added with a flame retarder is used as the adhesive layer, the invention may be also applied to the case where this resin is replaced by a heat-curable resin such as an epoxy resin added with a flame retarder or a pressure-sensitive adhesive resin added with a flame retarder.

NINTH EMBODIMENT

Figure 32:
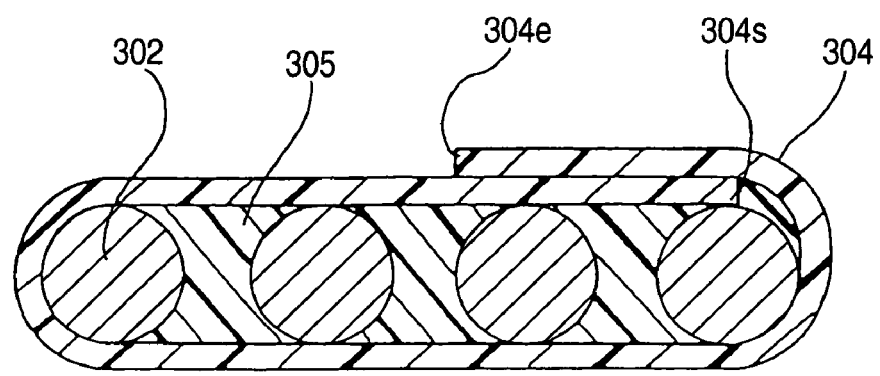
FIG. 32 is a sectional view showing a ribbon-like optical fiber core assembly according to a nineteenth embodiment of the invention.

Although the eighth embodiment has been described on the case where the ribbon-like optical fiber core assembly is formed so that optical fiber cores 302 are sandwiched between two film bases 304a and 304b, this embodiment is configured as shown in FIG. 32. That is, an adhesive layer 305 made of a polyolefin resin added with a bromic flame retarder is applied on the inner side of a sheet 304 made of a polyethylene resin added with a bromic flame retarder. Four optical fiber cores 302 arranged planarly in a row at designated intervals are wound with the sheet 304. The sheet 304 is fixed to the four optical fiber cores 302 in the condition that the leading and trailing ends 304s and 304e overlap each other.

According to this configuration, coating removability can be kept good. When the ribbon-like optical fiber core assembly is to be separated into single cores, the film can be peeled easily from the bonding end between the leading end 304s and the trailing end 304e without damage of the optical fibers.

TENTH EMBODIMENT

Figure 33A:
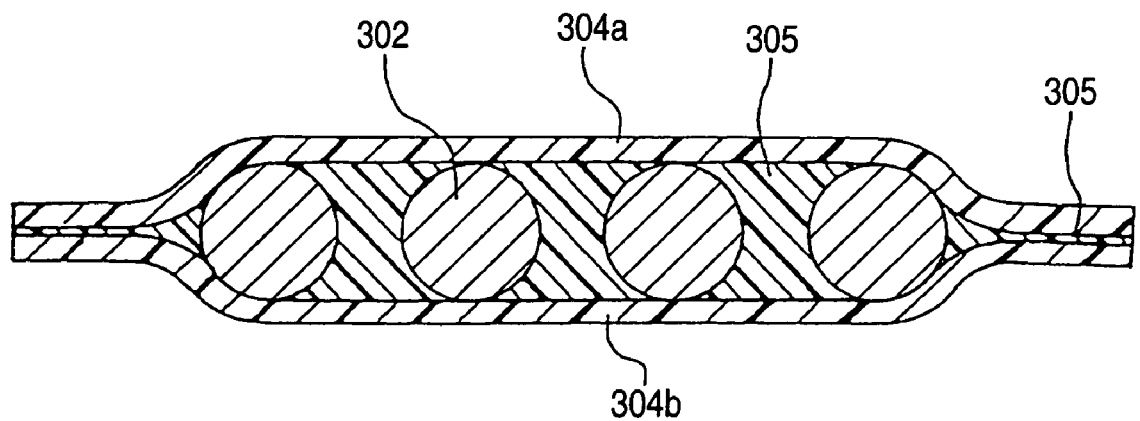
FIGS. 33A and 33B are sectional views showing a ribbon-like optical fiber core assembly according to a tenth embodiment of the invention.

Although the eighth embodiment has been described on the case where the ribbon-like optical fiber core assembly is formed so that optical fiber cores 302 are sandwiched between two film bases 304a and 304b, this embodiment is configured as shown in FIG. 33A. That is, two facing surfaces of the film bases 304a and 304b protruded from each end of arrangement of the optical fiber cores 302 arranged planarly at designated intervals are bonded to each other. The material of each film base 304a, 304b and the adhesive layer 305 are the same as those in the ninth embodiment.

According to this configuration, coating removability can be kept good. When the ribbon-like optical fiber core assembly is to be separated into single cores, the films can be peeled easily from the bonding ends without damage of the optical fibers if peeling is started from the portion protruded from each end of arrangement of the optical fiber cores.

Figure 33B:
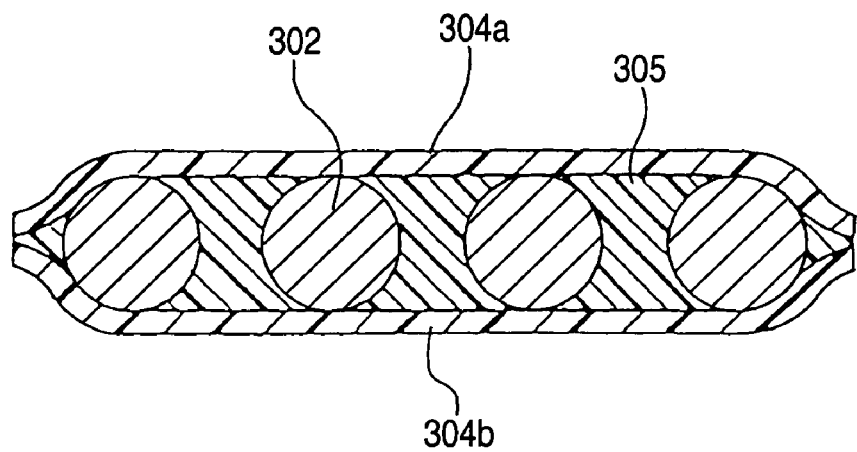

This embodiment may be modified as shown in FIG. 33B. That is, film parallel portions at the end portions are removed so that the end portions are shortened. Accordingly, space efficiency can be made high while both single core separability and coating removability can be kept good.

According to this configuration, the film bases can be bonded to the cores by only a simple compression bonding process, so that excellent production efficiency can be obtained.

ELEVENTH EMBODIMENT

Figure 34:
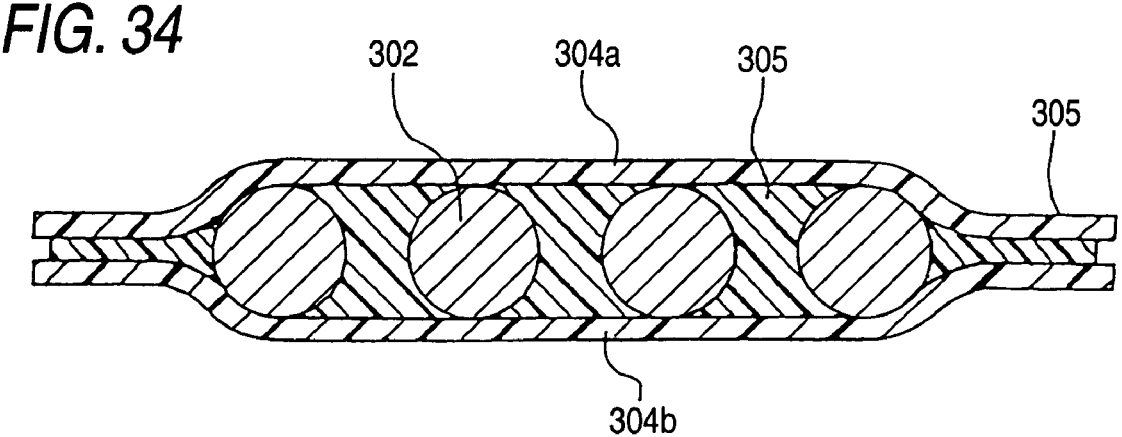
FIG. 34 is a sectional view showing a ribbon-like optical fiber core assembly according to an eleventh embodiment of the invention.

Although the tenth embodiment has described on the case where the ribbon-like optical fiber core assembly is formed so that optical fiber cores 302 arranged planarly are sandwiched between two film bases 304a and 304b and two facing surfaces of the film bases 304a and 304b protruded from each end of arrangement of the optical fiber cores 302 are bonded to each other, this embodiment is configured as shown in FIG. 34. That is, two facing surfaces of the film bases 304a and 304b protruded from each end of arrangement of the optical fiber cores 302 arranged planarly at designated intervals are bonded to each other. Furthermore, the adhesive layer 305 is formed so that regions of application of the adhesive agent come short of the outer ends of the film bases respectively, that is, the end surfaces of the film bases 304a and 304b contain non-bonded regions respectively. The material of each film base 304a, 304b and the adhesive layer 305 are the same as those in any one of the eighth, ninth and tenth embodiments.

According to this configuration, because the plurality of optical fiber cores arranged planarly at designated intervals so as not to be in contact with one another are covered with the adhesive layer, coating protection can be kept good. In addition, the batch coating can be removed easily. When the ribbon-like optical fiber core assembly is to be separated into single cores, the coating can be peeled easily from the non-bonded regions. In this manner, the films can be peeled easily from the bonding ends without damage of the optical fibers.

In this configuration, because the end surfaces of the film bases 304a and 304b contain the non-bonded regions, the film bases 304a and 304b can be peeled easily from the non-bonded regions. Because two facing surfaces of the film bases protruded from each end of arrangement of the plurality of optical fiber cores arranged planarly at designated intervals are bonded to each other and the end surfaces of the film bases are exposed, there is an advantage that the film bases can be peeled easily from the end surfaces.

According to this configuration, the film bases can be bonded to the cores by only a simple compression bonding step, so that excellent production efficiency can be obtained.

Incidentally, the optical fiber cores are formed at designated intervals of a predetermined pitch. Connector or fiber array components provided for a multi-core tape core assembly having cores formed at regular intervals of a pitch equal to the pitch may be used as the optical fiber cores. The optical fiber cores need not be arranged at regular intervals, that is, the pitch of arrangement of the optical fiber cores can be changed suitably. When the optical fiber cores are arranged at regular intervals, the ribbon-like optical fiber core assembly can be easily connected to a connector or a fiber array.

Figure 35:
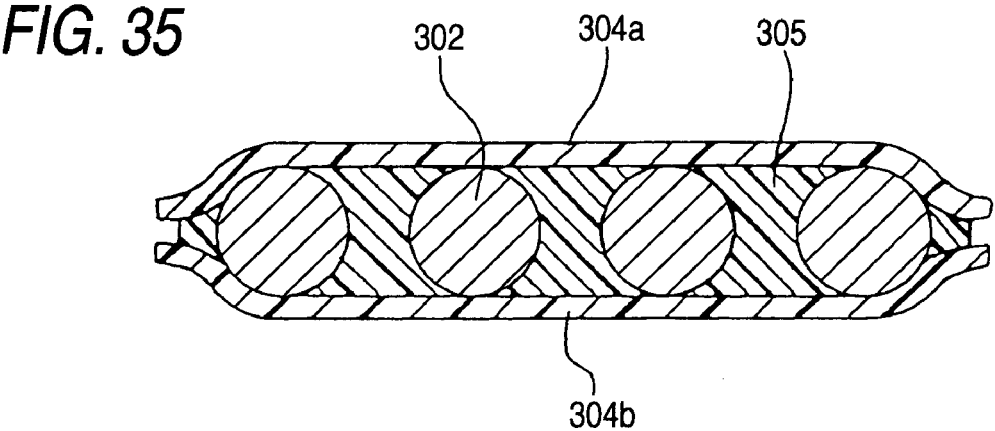
FIG. 35 is a sectional view showing a modified example of the ribbon-like optical fiber core assembly according to the eleventh embodiment of the invention.

This embodiment may be modified as shown in FIG. 35. That is, the end surfaces of the film bases 304a and 304b may be shortened so that reduction in size of the ribbon-like optical fiber core assembly can be attained. As a result, space efficiency can be made high while both single core separability and coating removability can be kept good.

TWELFTH EMBODIMENT

Figure 36:
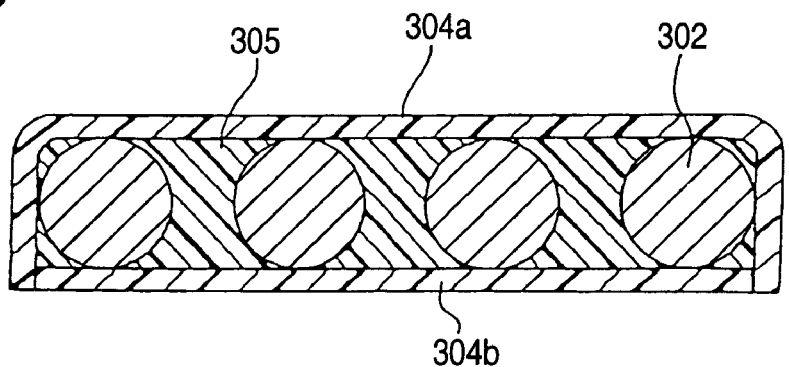
FIG. 36 is a sectional view showing a ribbon-like optical fiber core assembly according to a twelfth embodiment of the invention.

Although the tenth embodiment has been described on the case where the ribbon-like optical fiber core assembly is formed so that optical fiber cores 302 arranged planarly at designated intervals are sandwiched between two film bases 304a and 304b and that two facing surfaces of the film bases 304a and 304b protruded from each end of arrangement of the optical fiber cores 302 are bonded to each other, this embodiment is configured as shown in FIG. 36. That is, a U-shaped film base 304a is formed so that side and upper surfaces of a row of optical fiber cores 302 arranged planarly are covered with the film base 304a and that opposite ends of the film base 304a are in contact with opposite ends of a film base 304b with which a lower surface of the row of optical fiber cores 302 is covered. The material of each film base 304a, 304b and the adhesive layer 305 are the same as those in any one of the eighth, ninth and tenth embodiments.

According to this configuration, coating removability can be kept good. When the ribbon-like optical fiber core assembly is to be separated into single cores, the coating can be peeled easily from the bonding ends between the film bases. In this manner, the films can be peeled easily from the bonding ends without damage of the optical fibers.

THIRTEENTH EMBODIMENT

Figure 37:
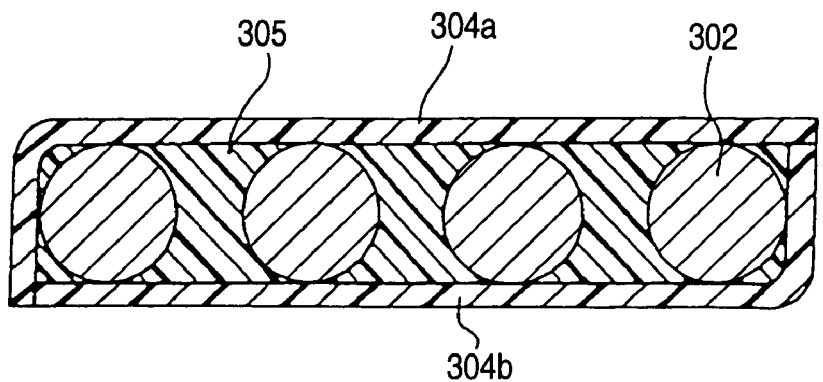
FIG. 37 is a sectional view showing a ribbon-like optical fiber core assembly according to a thirteenth embodiment of the invention.

Although the tenth embodiment has been described on the case where the ribbon-like optical fiber core assembly is formed so that optical fiber cores 302 arranged planarly at designated intervals are sandwiched between two film bases 304a and 304b and that two facing surfaces of the film bases 304a and 304b protruded from each end of arrangement of the optical fiber cores 302 are bonded to each other, this embodiment is configured as shown in FIG. 37. That is, a row of optical fiber cores 302 arranged planarly at designated intervals is surrounded by two L-shaped film bases 304a and 304b so that the two film bases 304a and 304b are in contact with each other at two regions on a diagonal line.

The material of each film base 304a, 304b and the adhesive layer 305 are the same as those in any one of the eighth, ninth and tenth embodiments.

According to this configuration, coating removability can be kept good. When the ribbon-like optical fiber core assembly is to be separated into single cores, the batch coating can be removed easily from the bonding ends between the film bases. In this manner, the films can be peeled easily from the bonding ends without damage of the optical fibers.

FOURTEENTH EMBODIMENT

Figure 38:
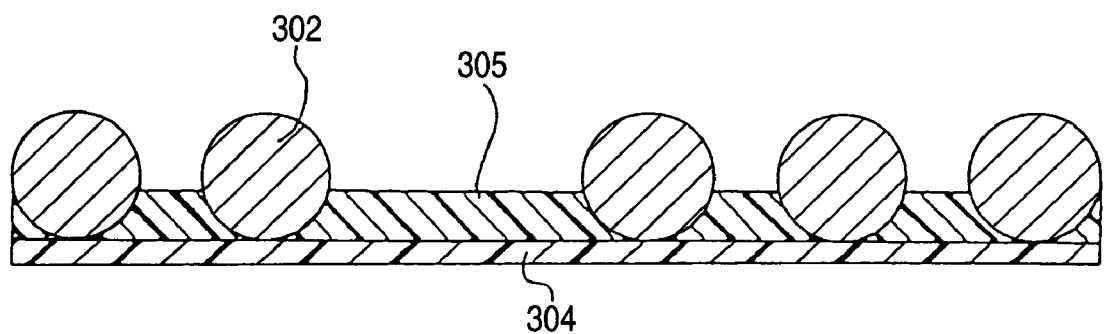
FIG. 38 is a sectional view showing a ribbon-like optical fiber core assembly according to a fourteenth embodiment of the invention.

Although the eighth to thirteenth embodiments have been described on the case where the row of optical fiber cores 302 arranged planarly at designated intervals is covered with at least one flame retardant film so as to be surrounded by the flame retardant film, this embodiment is configured as shown in FIG. 38. That is, only one surface of the row of optical fiber cores 302 arranged planarly at designated intervals is fixed by a film base 304 having an adhesive layer 305 formed thereon. In this embodiment, the optical fiber cores 302 are arranged not at regular intervals but at intervals according to necessity. The material of the film base 304 and the adhesive layer 305 are the same as those in any one of the eighth, ninth and tenth embodiments.

According to this configuration, when the ribbon-like optical fiber core assembly is to be separated into single cores, the film can be peeled easily because one surface of the row of optical fiber cores 302 is exposed. In addition, the adhesive layer enters in between the optical fiber cores 302 and in between the film base and each optical fiber core, so that coating removability can be kept good.

In this manner, the film can be peeled easily from its ends without damage of the optical fibers.

Although this embodiment shows the case where one surface of the row of optical fiber cores is exposed, minimum flame retardancy can be obtained when an optical fiber cord or cable is formed so that the film base faces outward.

According to this structure, the film base can be bonded to the cores by only a simple compression bonding step, so that excellent production efficiency can be obtained.

FIFTEENTH EMBODIMENT

Figure 39:
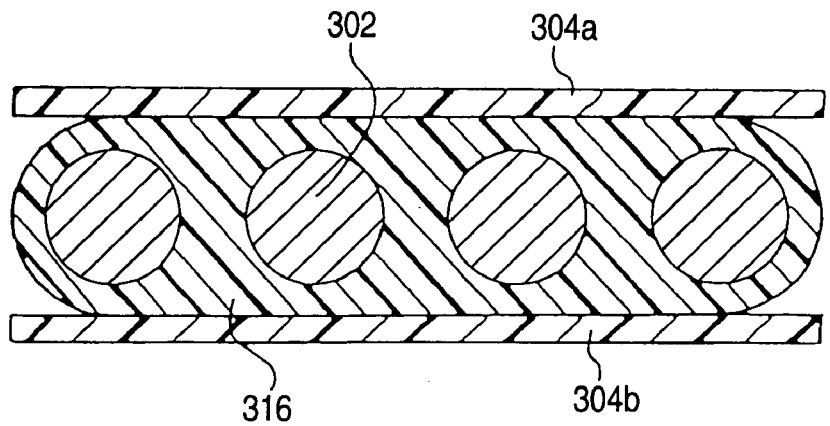
FIG. 39 is a sectional view showing a ribbon-like optical fiber core assembly according to a fifteenth embodiment of the invention.

Although the fourteenth embodiment has been described on the case where the row of optical fiber cores 302 arranged planarly is directly surrounded by film bases 304a and 304b each having an adhesive layer 305 formed thereon, this embodiment is configured as shown in FIG. 39. That is, the ribbon-like optical fiber core assembly is molded so that the row of optical fiber cores 302 arranged planarly at designated intervals is coated with a UV-curable resin 316 serving as an adhesive layer and that the outside of the UV-curable resin 316 is covered with film bases 304a and 304b each having an adhesive layer 305 formed thereon in the same manner as in the tenth embodiment.

The material of each film base 304a, 304b and the adhesive layer 305 are the same as those in any one of the eighth, ninth and tenth embodiments.

That is, in this embodiment, the ribbon-like optical fiber core assembly is molded so that the outer circumferences of the optical fiber cores 302 arranged planarly in a row are covered with the UV-curable resin 316 and that the outside of the UV-curable resin 316 is surrounded by the flame retardant film bases 304a and 304b each having the adhesive layer 305 formed thereon.

In this manner, a strong and highly reliable ribbon-like optical fiber core assembly can be formed.

Incidentally, if sufficient adhesion can be provided by the UV-curable resin 316, the adhesive layer 305 may be dispensed with.

SIXTEENTH EMBODIMENT

Figure 40:
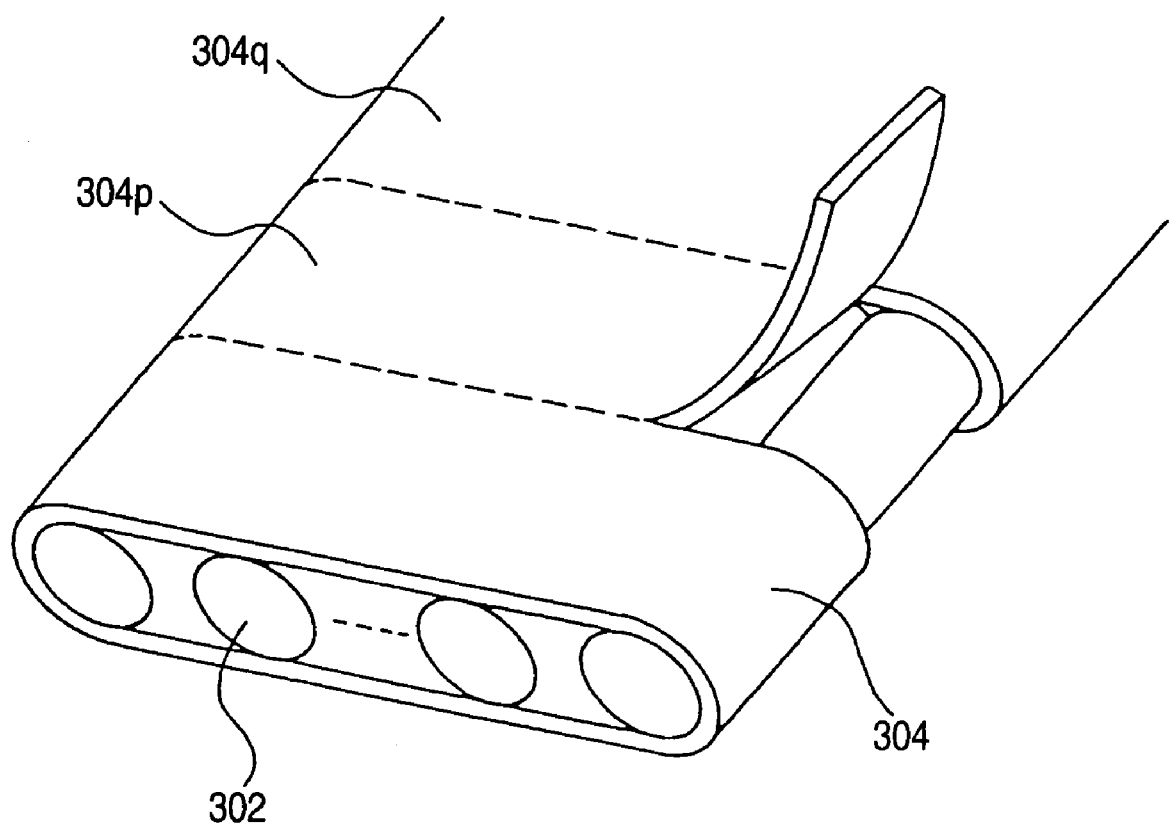
FIG. 40 is a perspective view showing a ribbon-like optical fiber core assembly according to a sixteenth embodiment of the invention.
Figure 41A:
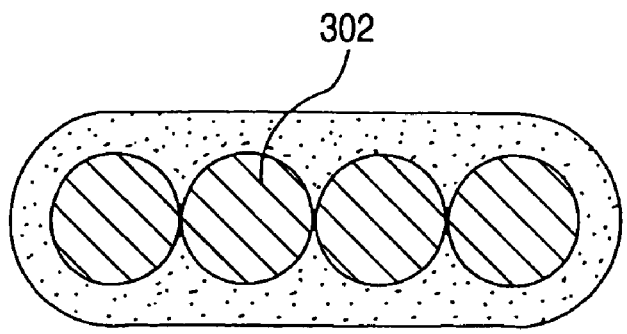
FIGS. 41A to 41C are sectional views showing highly flame-retardant tape cords according to the related art.
Figure 41B:
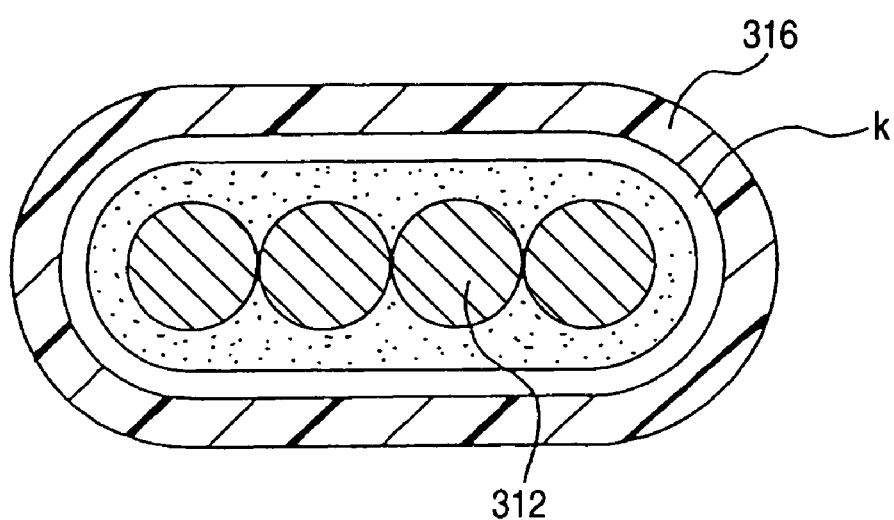
Figure 41C:
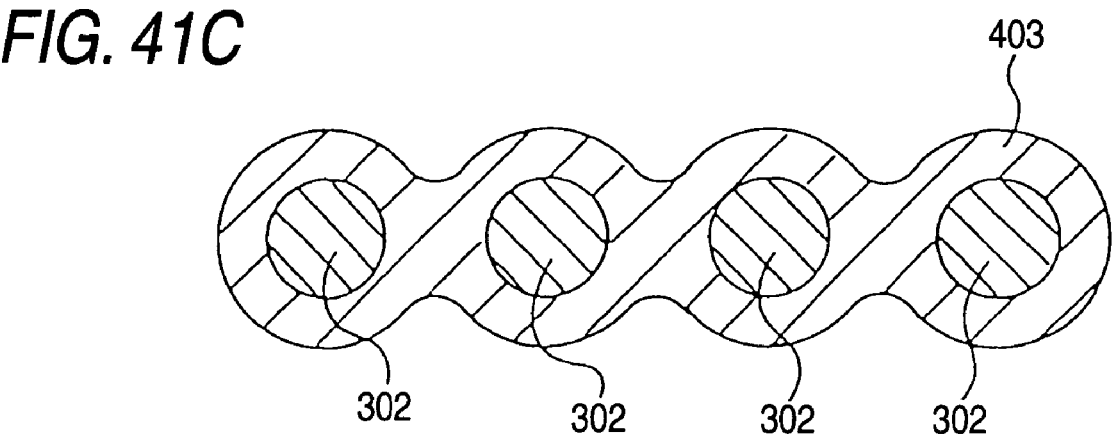

In this embodiment, as shown in FIG. 40, an easily removable region 304p is formed so that the tape can be peeled easily with a designated width. In this embodiment, cutoff grooves are formed by mechanical processing to thereby form the easily removable region 304p so that the easily removable region 304p can be separated at the boundary between the easily removable region 304p and a normal region 304q.

Also in this case, optical fiber cores 302 arranged planarly at designated intervals are directly covered with a flame retardant film so as to be surrounded by the flame retardant film.

The material of the film base per se and the adhesive layer 305 are the same as those in any one of the previous embodiments.

According to this configuration, when the ribbon-like optical fiber core assembly is to be separated into single cores, the film can be peeled easily at the easily removable region.

Incidentally, the easily removable region 304p may be formed by a method in which the easily removable region 304p is stuck as a separately provided material so that the easily removable region 304p can be separated at the boundary between the easily removable region 304p and the normal region 304q or by a method in which a uniaxially stretched film is disposed and bonded in such a manner that the stretching direction of the uniaxially stretched film crosses the fibers perpendicularly so that the film base can be torn up at any portion.

The film base can be selected suitably according to the purpose and required performance. The film base may be selected from not only polyester but also polyvinyl chloride (PVC), polyimide, etc.

The thermoplastic adhesive agent may be selected suitably from not only polyester but also a PVC adhesive agent, a polyolefin adhesive agent.

For example, the easily removable region is preferably formed at a small pitch so that the pitch is smaller than the twisting pitch of a SZ cable. Even in the case where the SZ cable needs to branch intermediately after the SZ cable is laid, the SZ cable can be freely separated into single cores by this configuration.

SEVENTEENTH EMBODIMENT

Figure 42:
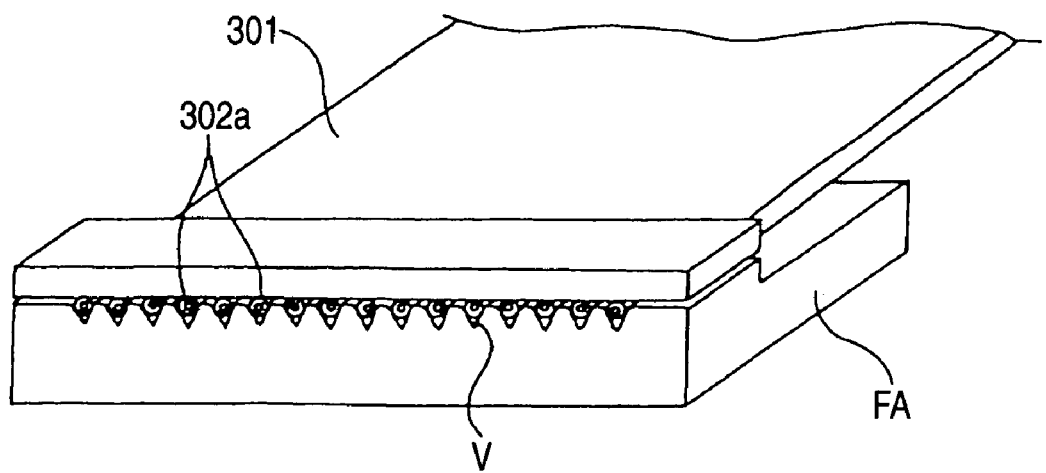
FIG. 42 is a view showing a fiber array according to a seventeenth embodiment of the invention.

As shown in FIG. 42, a tape core assembly-containing fiber array can be formed effectively as follows. The film 304 is collectively peeled at an end of the ribbon-like optical fiber core assembly shown in any one of the eighth to sixteenth embodiments so that glass fibers 302a are exposed. The glass fibers 302a are attached into grooves V of a fiber array FA.

EIGHTEENTH EMBODIMENT

Figure 43:
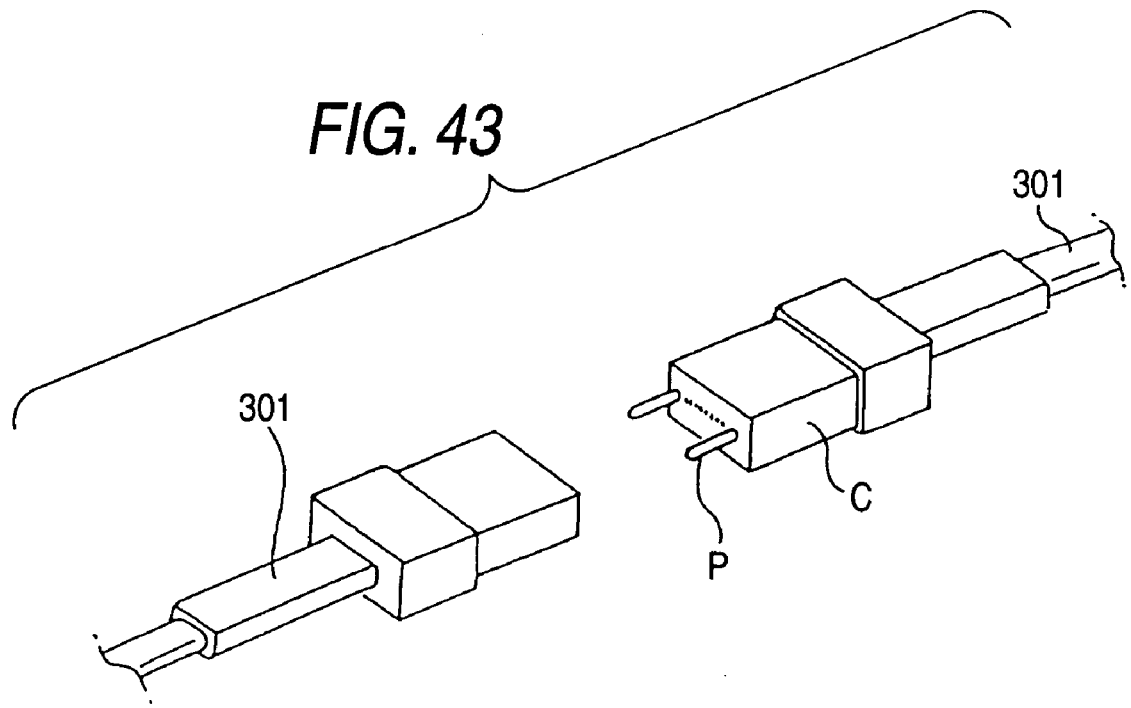
FIG. 43 is a view showing a tape core assembly-containing connector according to an eighteenth embodiment of the invention.

As shown in FIG. 43, a tape core assembly-containing connector can be formed effectively as follows. That is, the tape core assembly-containing connector is formed in such a manner that the ribbon-like optical fiber core assembly shown in any one of the eighth to sixteenth embodiments is connected to a multi-core connector C. In the tape core assembly-containing connector, intermediate branch connection can be made easily. In FIG. 43, the reference character P designates a positioning pin.

A tape core assembly-containing connector formed in such manner that the ribbon-like optical fiber core assembly is connected to an all-resin multi-core optical ferrule molded of a flame retardant resin while the film 304 of ribbon-like optical fiber core assembly is made flame-retardant can be provided effectively. Because both the tape core assembly and the ferrule directly touching the optical fibers are made flame-retardant, contingencies can be prevented from occurring.

An optical wiring system formed in such a manner that the ribbon-like optical fiber core assembly configured as described above or the ribbon-like optical fiber core assembly formed by the aforementioned method is wired can be provided effectively.

INDUSTRIAL APPLICABILITY

As described above, in the ribbon-like optical fiber core assembly according to the invention, the tape layer can be easily peeled to expose the optical fiber cores. Accordingly, a ribbon-like optical fiber core assembly capable of being easily separated into single cores can be provided. In addition, a ribbon-like optical fiber core assembly thin and flame-retardant can be provided.

In the method for producing the ribbon-like optical fiber core assembly according to the invention, a ribbon-like optical fiber core assembly capable of being easily separated into single cores can be provided easily, efficiently and without use of any special jig. In addition, the constituent members of the tape layer little remain on surfaces of the separated optical fiber cores, so that the residue of the constituent members does not disturb use of various kinds of components and tools originally prepared for single optical fiber cores.

Further, as described above, in the film for tape core assembly and the method for integrating optical fibers as a tape according to the invention, two upper and lower films are bonded to each other while optical fibers are sandwiched between the two films in the condition that the optical fibers are positioned into position limiting portions provided in the films, that is, in the condition that the optical fibers cannot move. Accordingly, the optical fibers can be integrated as a tape while held at intervals of a designated pitch.

Further, as described above, according to the invention, a ribbon-like optical fiber core assembly from which the batch coating can be removed and which can be easily separated into single cores can be provided. Furthermore, a ribbon-like optical fiber core assembly which is good in coating characteristic, thin and flame-retardant can be provided.

In addition, according to a method for producing a ribbon-like optical fiber core assembly according to the invention, a ribbon-like optical fiber core assembly from which batch coating can be removed and which can be separated into single cores can be provided easily and efficiently.

The invention claimed is:

1. A ribbon-like optical fiber core assembly, comprising:
   a base layer;
   a plurality of optical fiber cores arranged planarly on the base layer;
   a plurality of position limiting portions limiting a plurality of positions of said plurality of optical fibers;
   an adhesive layer provided on said optical fiber cores; and
   at least one tape layer for integrating said plurality of optical fiber cores into one body,
   wherein said at least one tape layer has a tensile strength higher than an adhesive force of said at least one tape layer to said plurality of optical fiber cores,
   said optical fiber cores are compression bonded to the at least one tape layer,
     the adhesive layer is interposed between said optical fiber cores and the at least one tape layer, and
     the plurality of position limiting portions are provided on at least one of the adhesive layer and the base layer.

2. The ribbon-like optical fiber core assembly according to claim 1, wherein said tape layer includes a film base, and said adhesive layer.

3. The ribbon-like optical fiber core assembly according to claim 1, wherein said at least one tape layer has a high flame retardancy.

4. A ribbon-like optical fiber core assembly according to claim 2, wherein gaps are formed between said plurality of optical fiber cores that are adjacent one another;
   said adhesive layer is interposed in said gaps so that said gaps are filled with said adhesive layer; and
   said at least one tape layer is provided so that said plurality of optical fiber cores and said adhesive layer are covered with said at least one tape layer.

5. A tape core assembly-containing connector comprising:
   a ribbon-like optical fiber core assembly according to claim 4, and
   a multi-core connector connected with said ribbon-like optical fiber core assembly.

6. The tape core assembly-containing fiber array comprising:
   a ribbon-like optical fiber core assembly according to claim 4, and
   a fiber array connected with said ribbon-like optical fiber core assembly.

7. The optical wiring system comprising:
   a ribbon-like optical fiber core assembly according to claim 4,
   wherein said ribbon-like optical fiber core assembly is wired.

8. A method of separating a ribbon-like optical fiber core assembly into single cores, the fiber core assembly comprising:
   a base layer;
   a plurality of optical fiber cores arranged planarly on the base layer;
   a plurality of position limiting portions limiting a plurality of positions of said plurality of optical fibers;
   an adhesive layer provided on said optical fiber cores; and
   at least one tape layer for integrating said plurality of optical fiber cores into one body,
   wherein said at least one tape layer has a tensile strength higher than an adhesive force of said at least one tape layer to said plurality of optical fiber cores,
   said optical fiber cores are compression bonded to the at least one tape layer,
     the adhesive layer is interposed between said optical fiber cores and the at least one tape layer, and
     the plurality of position limiting portions are provided on at least one of the adhesive layer and the base layer,
   wherein the method comprises:
     bending said optical fiber core assembly to break said plurality of optical fiber cores at a predetermined breaking position; and
     applying a pulling force on said at least one tape layer in a direction of detachment from said plurality of optical fiber cores to thereby peel said at least one tape layer up to a predetermined position.

* * * * *